(12) United States Patent
Chitrakar et al.

(10) Patent No.: US 11,082,989 B2
(45) Date of Patent: Aug. 3, 2021

(54) COMMUNICATION APPARATUS AND METHOD

(71) Applicant: Panasonic Intellectual Property Corporation of America, Torrance, CA (US)

(72) Inventors: Rojan Chitrakar, Singapore (SG); Lei Huang, Singapore (SG); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 56 days.

(21) Appl. No.: 16/619,582

(22) PCT Filed: May 17, 2018

(86) PCT No.: PCT/JP2018/019004
§ 371 (c)(1),
(2) Date: Dec. 5, 2019

(87) PCT Pub. No.: WO2019/008915
PCT Pub. Date: Jan. 10, 2019

(65) Prior Publication Data
US 2020/0137770 A1 Apr. 30, 2020

(30) Foreign Application Priority Data
Jul. 6, 2017 (JP) .............................. JP2017-133120

(51) Int. Cl.
*H04W 48/12* (2009.01)
*H04W 84/12* (2009.01)
*H04W 72/12* (2009.01)
*H04L 5/00* (2006.01)
*H04W 52/02* (2009.01)
*H04W 72/04* (2009.01)
*H04L 27/26* (2006.01)

(52) U.S. Cl.
CPC ............ *H04W 72/12* (2013.01); *H04L 5/0007* (2013.01); *H04W 48/12* (2013.01); *H04W 52/0229* (2013.01); *H04W 72/0446* (2013.01); *H04L 27/2601* (2013.01); *H04W 84/12* (2013.01)

(58) Field of Classification Search
CPC ...... H04W 72/12; H04W 48/12; H04W 84/12
See application file for complete search history.

(56) References Cited

PUBLICATIONS

International Search Report of PCT application No. PCT/JP2018/019004 dated Jul. 31, 2018.

(Continued)

*Primary Examiner* — Angel T Brockman
(74) *Attorney, Agent, or Firm* — Seed IP Law Group LLP

(57) ABSTRACT

The present disclosure provides a transmission apparatus that comprises a first payload generator configured to generate payload of a packet of a first signal type; a second payload generator configured to generate payload of a packet of a second signal type; a packet scheduler that controls the transmission timings of the first and the second packet; and a transmitter which, in operation, transmits, under the timing control of the packet scheduler, the packet of the first signal type followed by the packet of the second signal type.

12 Claims, 20 Drawing Sheets

(56) References Cited

PUBLICATIONS

IEEE Std 802.11(TM)—2016, IEEE Standard for Information technology—Telecommunications and information exchange between systems, Local and metropolitan area networks—Specific requirements, Part 11: Wireless LAN Medium Access Control (MAC) and Physical Layer (PHY) Specifications, Dec. 14, 2016.
IEEE 802.11-17/0575r1, "Specification Framework for TGba", May 30, 2017.
IEEE 802.11-16/0722r1, "Proposal for Wake-Up Receiver (WUR) Study Group", May 18, 2016.
IEEE 802.11-17/0343r3, "WUR Beacon", Mar. 17, 2017.
IEEE 802.11-17/0342r4, "WUR Negotiation and Acknowledgement Procedure Follow Up", Mar. 17, 2017.
IEEE 802.11-17/0647r4, "WUR Legacy Preamble Design", May 10, 2017.

[Fig. 1]
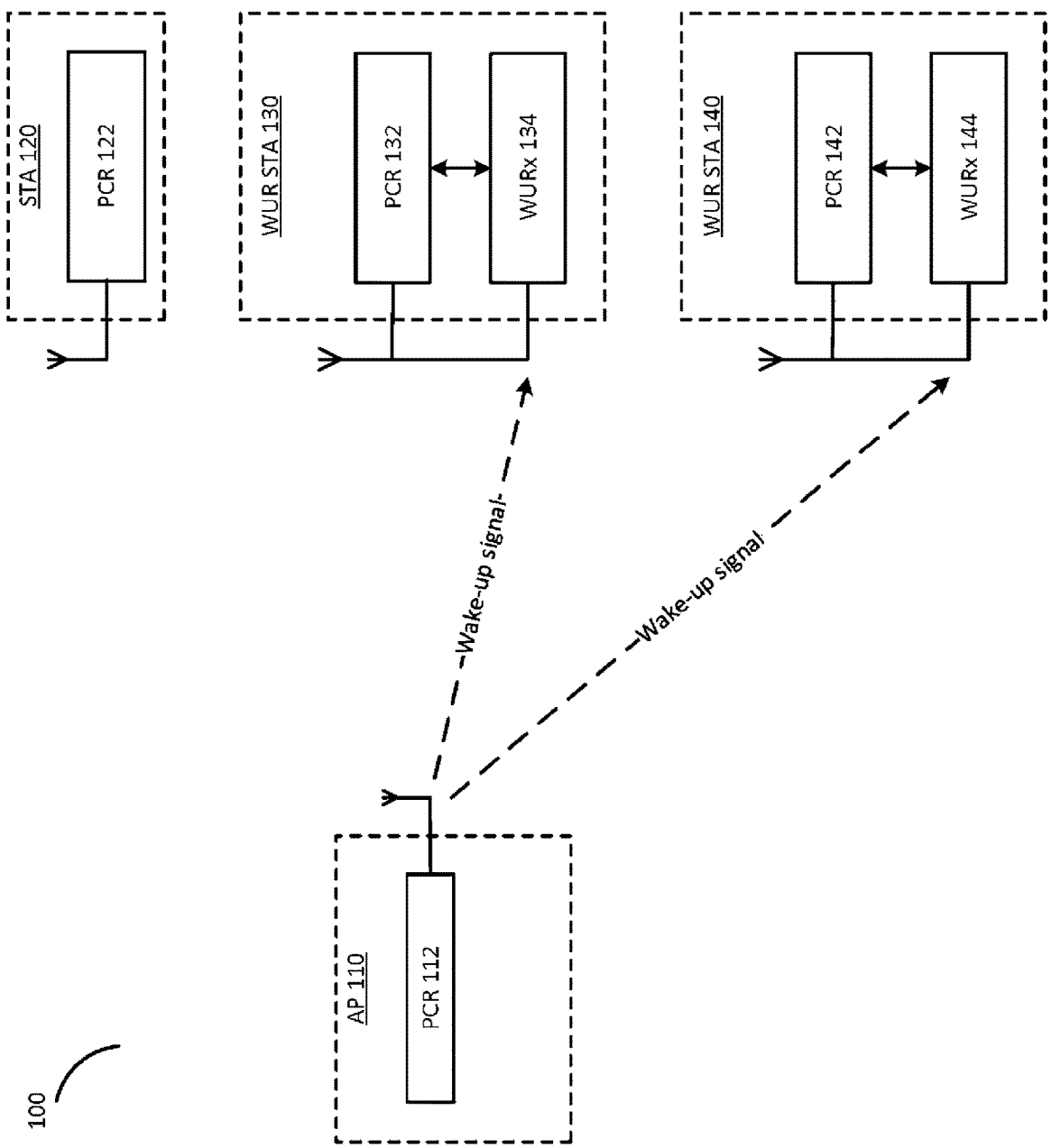

[Fig. 2]
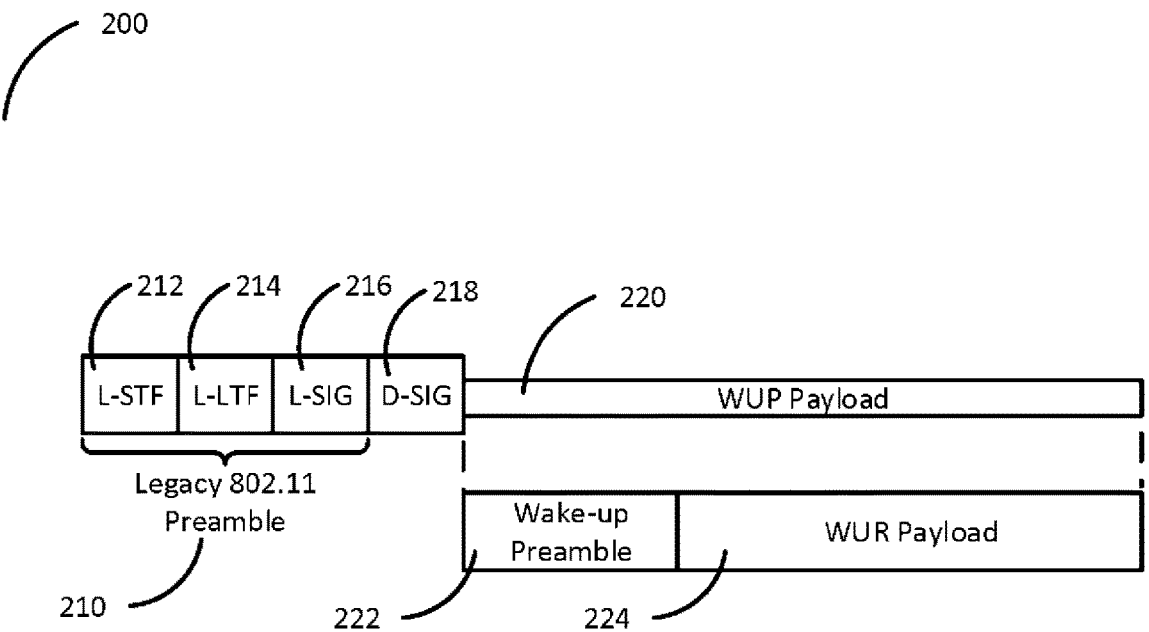

[Fig. 3]
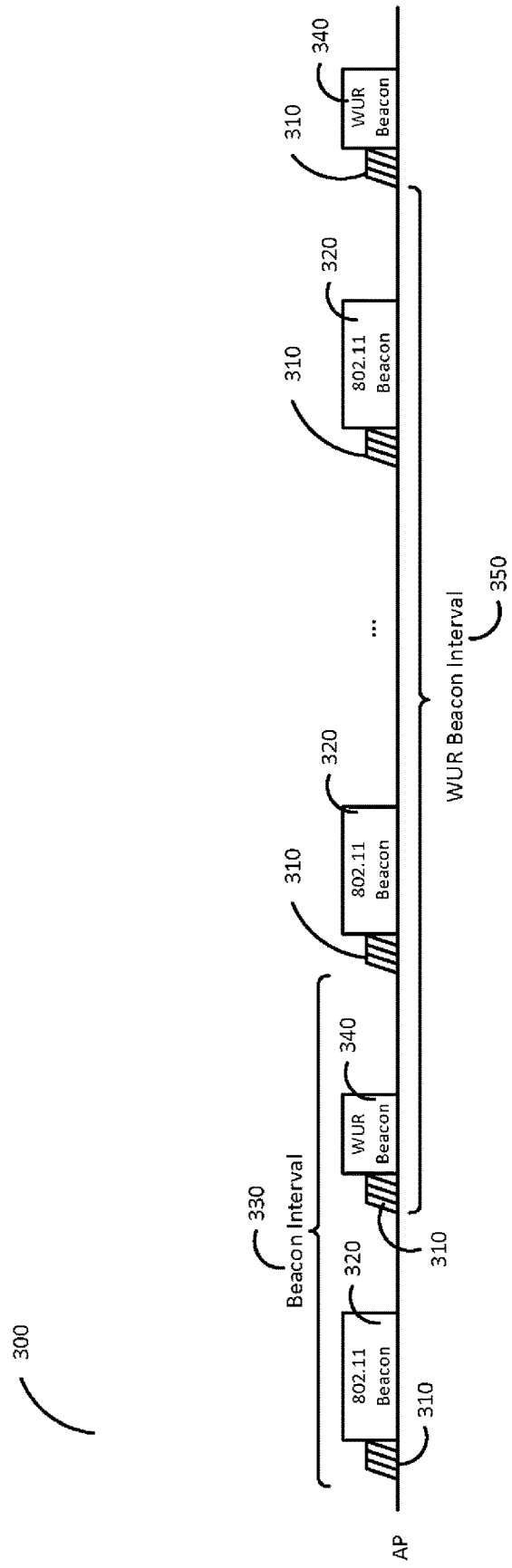

[Fig. 4]
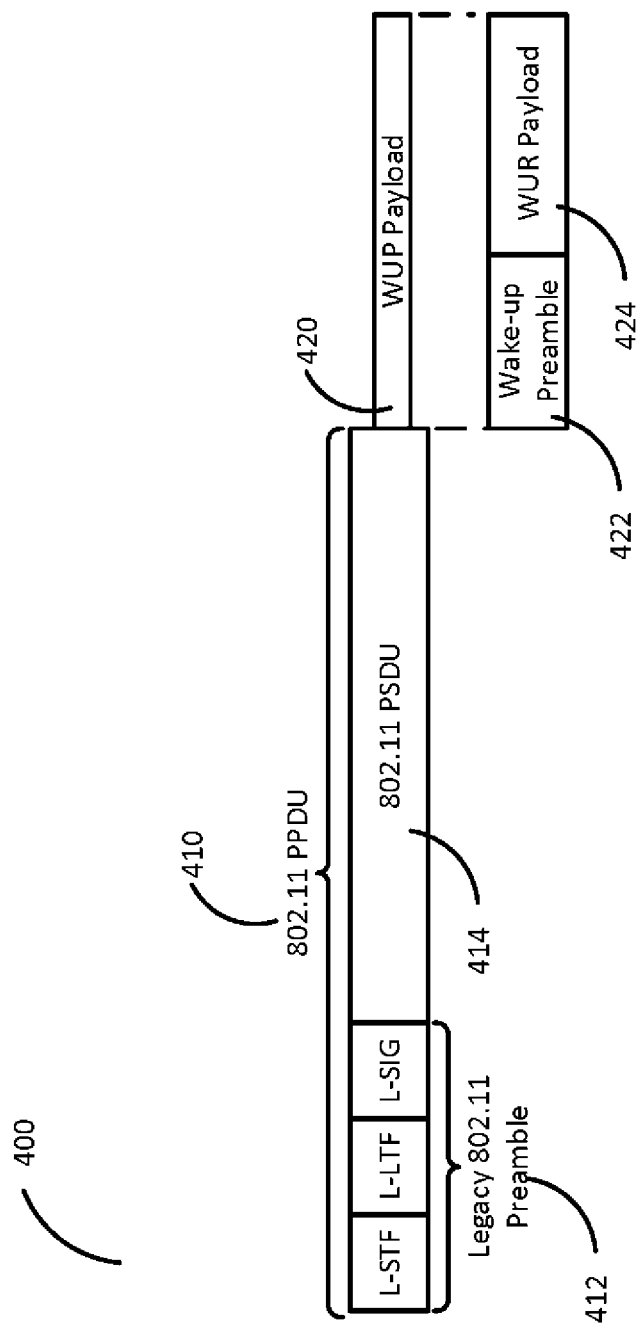

[Fig. 5]
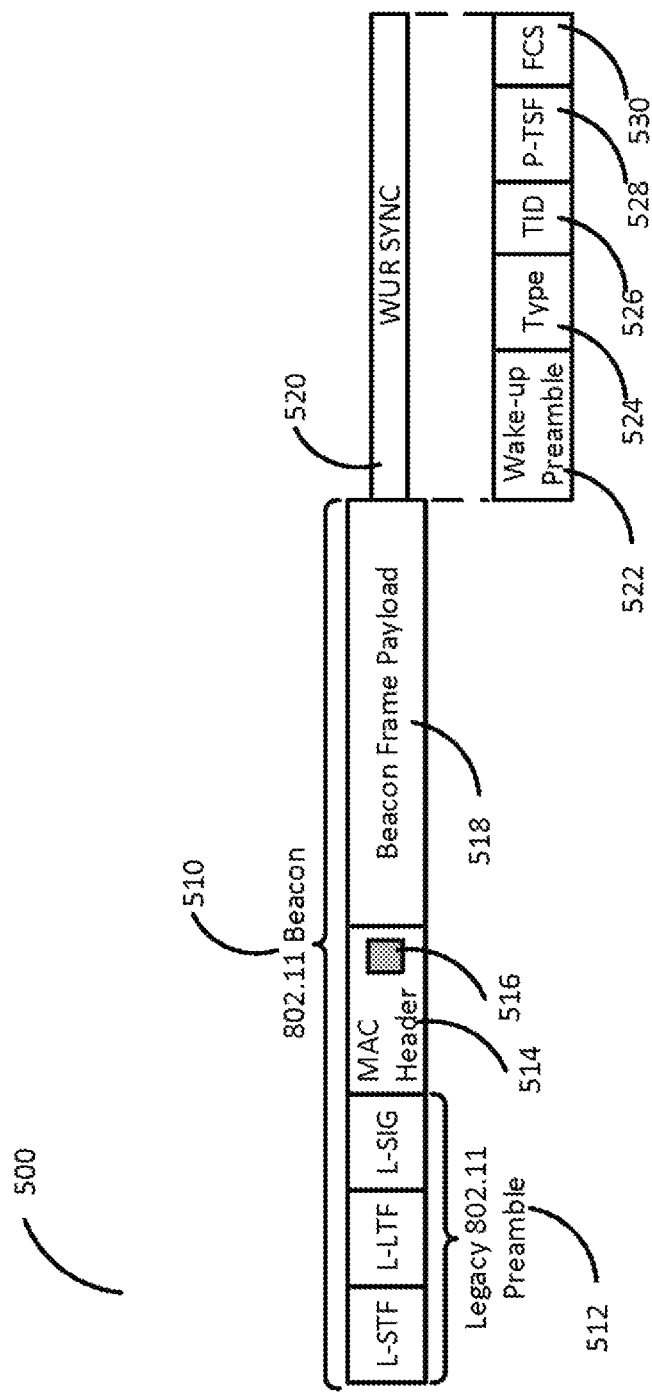

[Fig. 6]
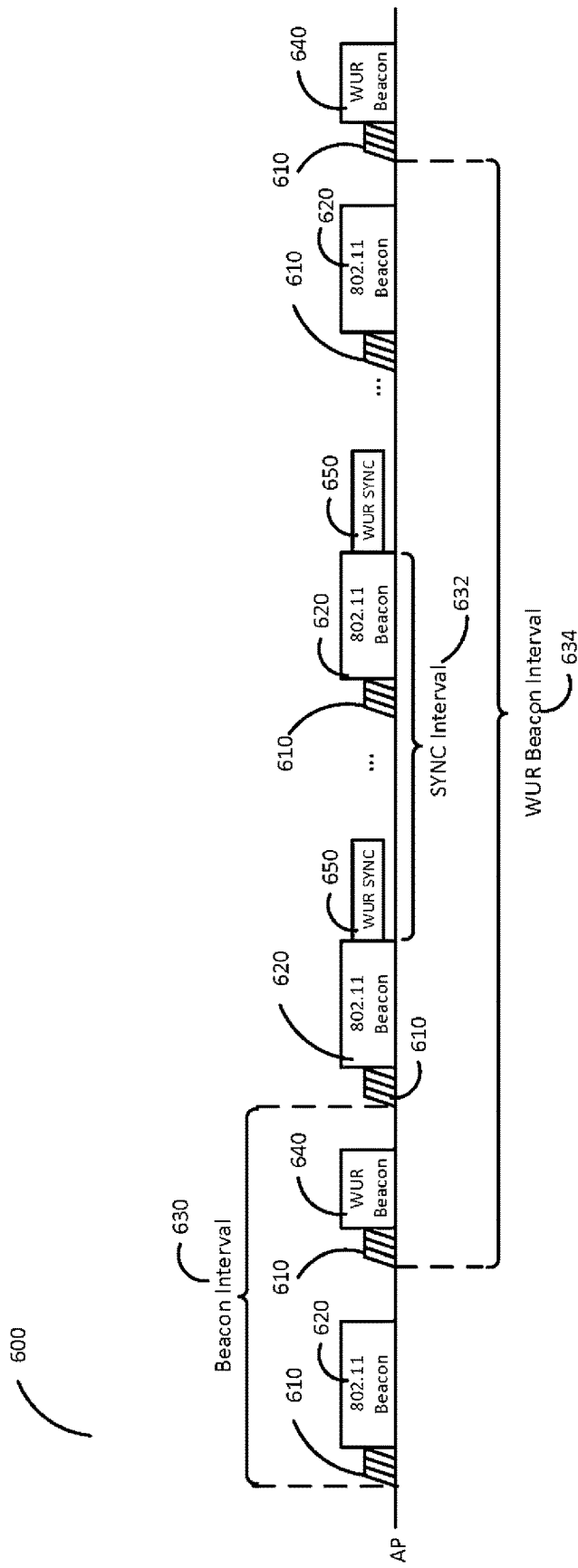

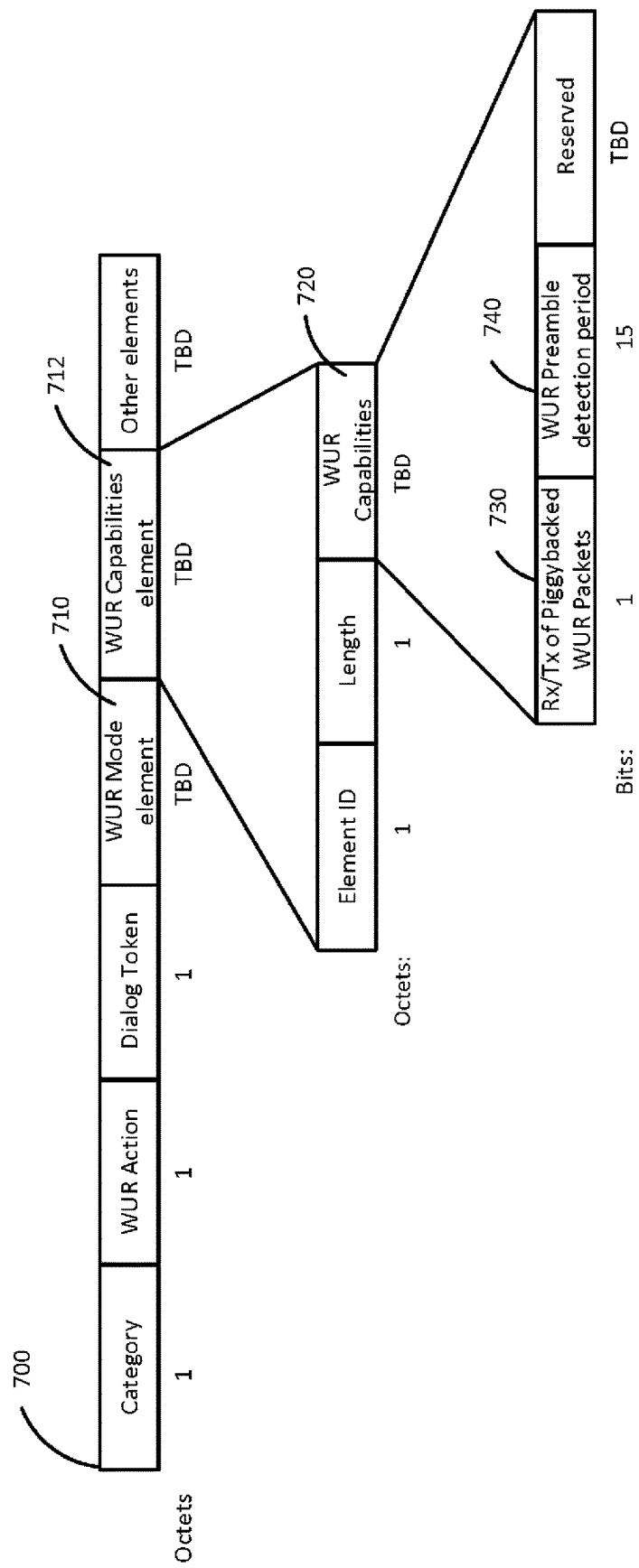
[Fig. 7]

[Fig. 8]
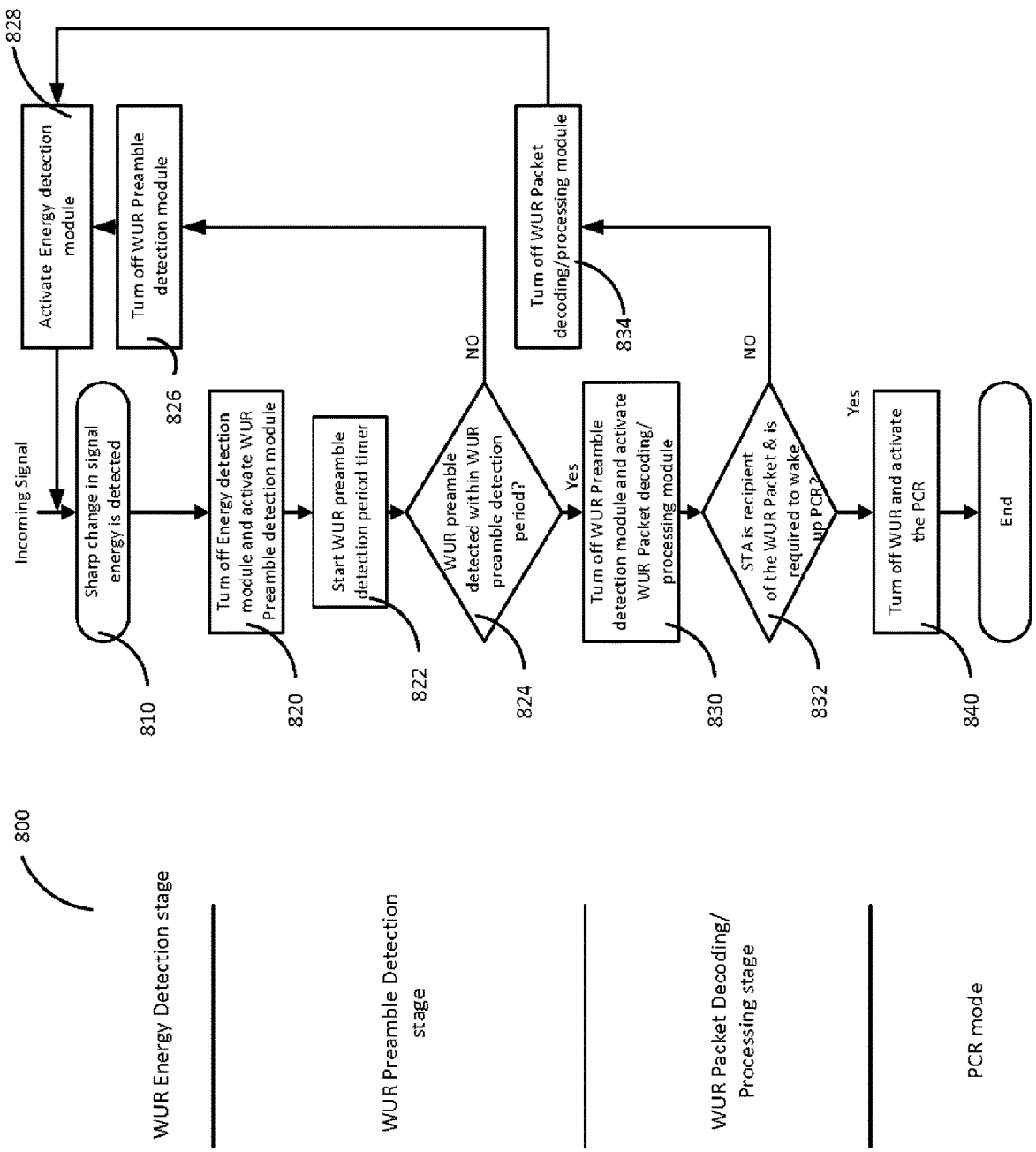

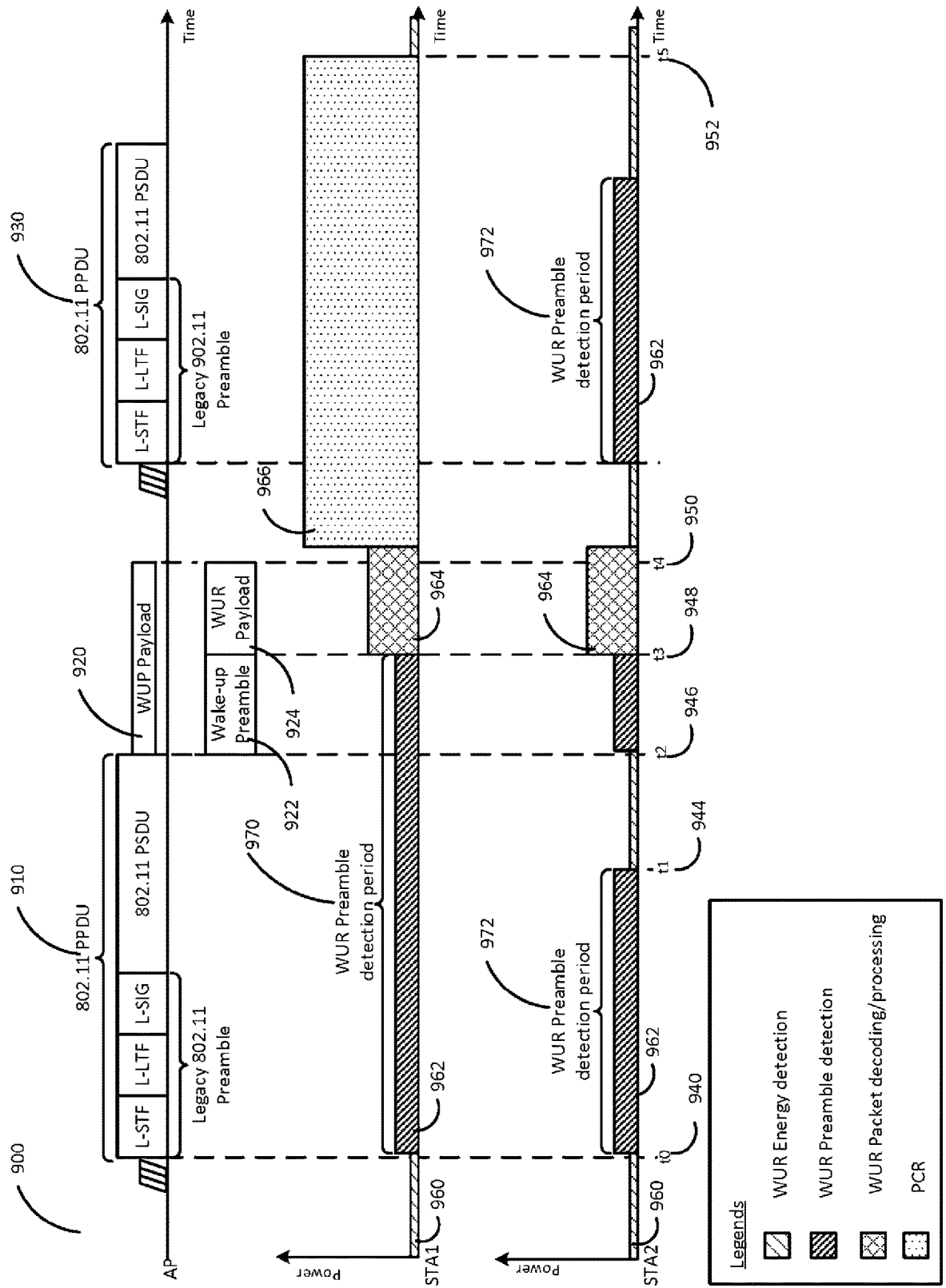
[Fig. 9]

[Fig. 10]

| PHY SAP Primitive | Parameter | Parameter Value | Description |
|---|---|---|---|
| PHY-WUR-DATA.request | DATA | Octet value X'00 to X'FF | This primitive is used to transfer an octet of WUP Payload data from the MAC sublayer to the local PHY entity. |
| PHY-WUR-DATA.confirm | NA | - | This primitive is issued by the PHY to the local MAC entity to confirm the transfer of WUR data from MAC entity to the PHY |
| PHY-WUR-TXSTART.request | WUR-TXVECTOR | A set of parameters | This primitive is issued by the MAC sublayer to the PHY entity to request the transmission of a WUR Packet. The WUR-TXVECTOR represents a set of parameters provided to the PHY entity in order to transmit the WUR Packet. |
| PHY-WUR-TXSTART.confirm | NA | - | This primitive is issued by the PHY to the local MAC entity to confirm the start of the transmission of a WUR Packet. |
| PHY-WUR-TXEND.request | NA | - | This primitive is issued by the MAC sublayer to the PHY entity to end the transmission of the WUR Packet. |
| PHY-WUR-TXEND.confirm | NA | - | This primitive is issued by the PHY to the local MAC entity to confirm the completion of the transmission of a WUR Packet. |

| Parameter | Associated VECTORs | Value |
|---|---|---|
| ADD-WUR | TXVECTOR | Enumerated Types:<br>ADD_WUR_NOGAP indicates that this PPDU is immediately followed by a payload portion of a Wake up Packet without any IFS or legacy preamble.<br>- ADD-WUR-GAP indicates that this PPDU is followed by a payload portion of a Wake up Packet without legacy preamble after a gap of a fixed number of OFDM symbols.<br>- NO-ADD-WUR indicates that no WUR packet follows this PPDU. |
| WUR_FORMAT | TXVECTOR<br>WUR-TXVECTOR | Indicates the format of WUR Packet.<br>Enumerated type:<br>- WUR_SU indicates WUR Packet with a single WUP Payload.<br>- WUR_MU indicates WUR Packet with multiple WUP Payloads.<br>- WUR_OFDMA indicates WUR Packet transmitted using OFDMA. |
| WUR_L_PREAMBLE | TXVECTOR<br>WUR-TXVECTOR | Indicates whether the 802.11 legacy preamble precedes the WUP Payload.<br>Enumerated type:<br>- PRESENT indicates that a 802.11 legacy preamble is present immediately before the WUP Payload.<br>- NOT_PRESENT indicates that a 802.11 legacy preamble is not present immediately before the WUP Payload. |
| WUR_L_LENGTH | TXVECTOR<br>WUR-TXVECTOR | Indicates the length of the WUP Payload i.e. the length of the WUR portion of the WUR packet that follows the legacy preamble. This value is used to set the LENGTH field of the L-SIG. Only present if WUR_L_PREAMBLE is set to PRESENT. |
| WUR_MODULATION | TXVECTOR<br>WUR-TXVECTOR | Indicates the modulation used for WUR Packet.<br>Enumerated type:<br>- WUR_OOK indicates OOK modulation<br>- WUR_BIPOLAR_OOK indicates Bipolar modulation |
| WUR_LENGTH | TXVECTOR<br>WUR-TXVECTOR | Indicates length of the WUR Payload. Signalled in the Wakeup preamble. |
| WUR_DATARATE | TXVECTOR<br>WUR-TXVECTOR | Indicates the data rate of the WUR Payload. Signalled in the Wakeup preamble. |

1100

[Fig. 12]
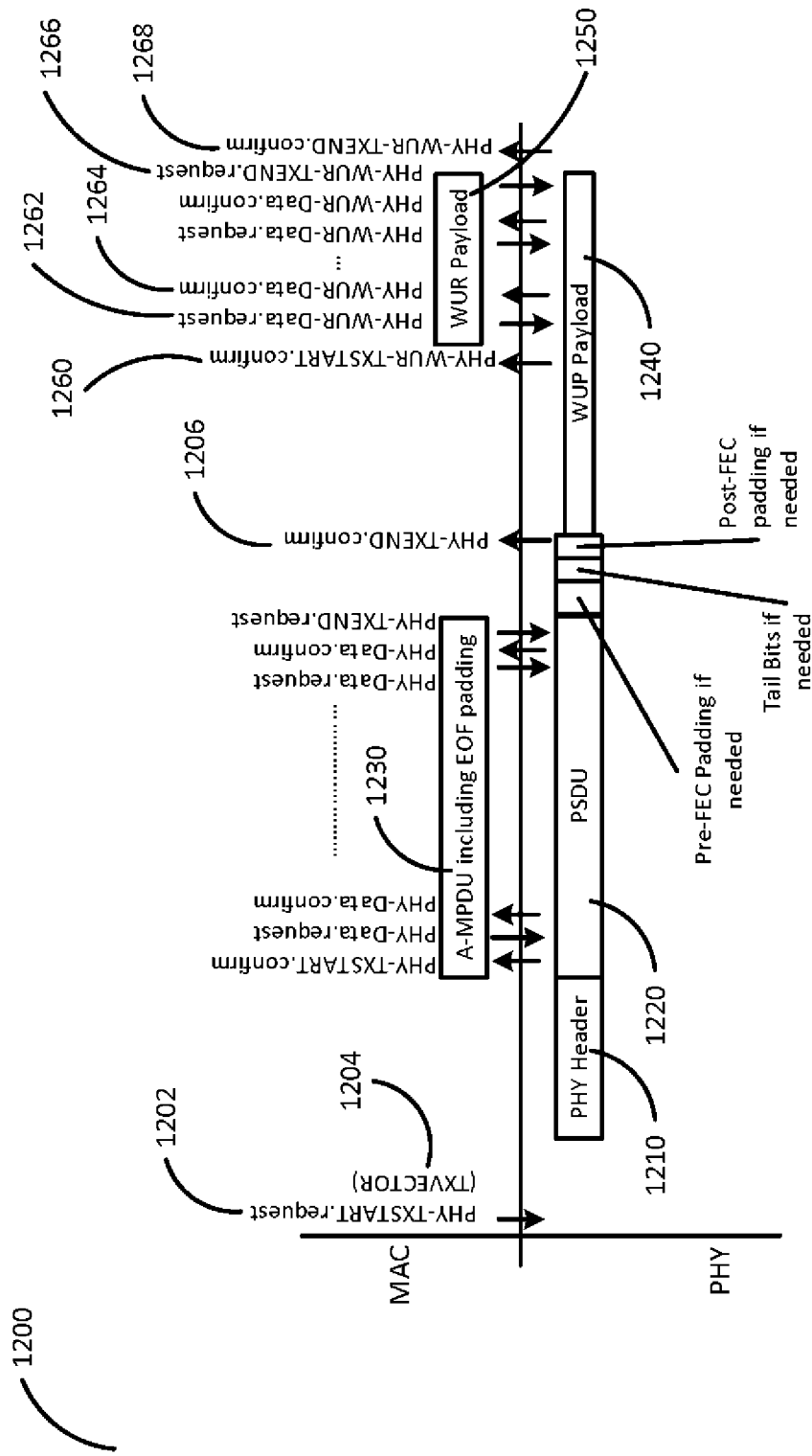

[Fig. 13]
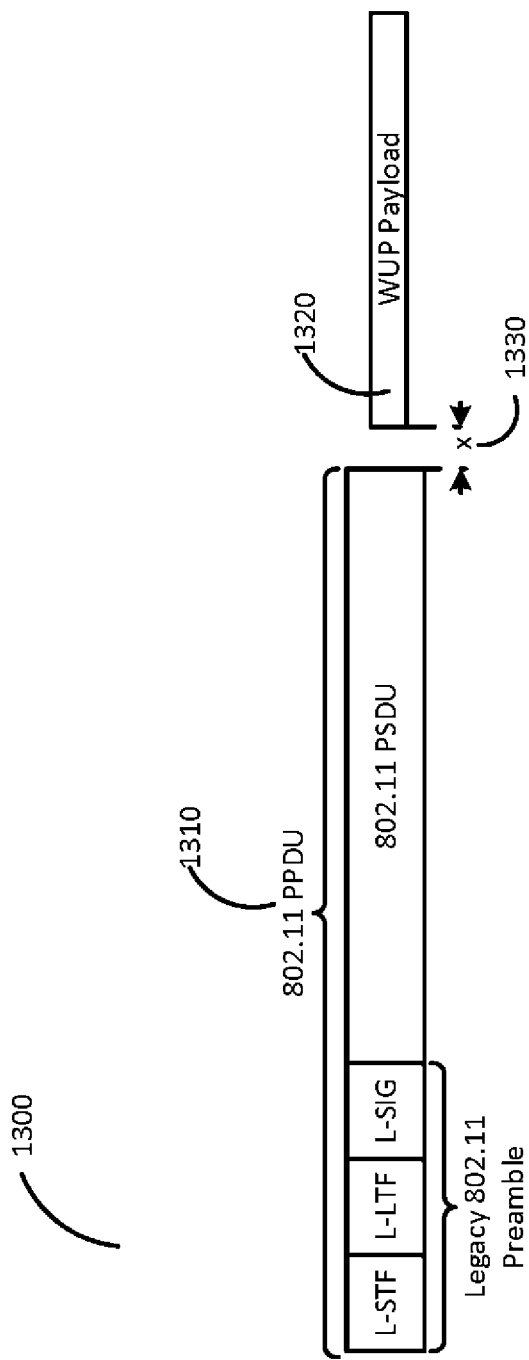

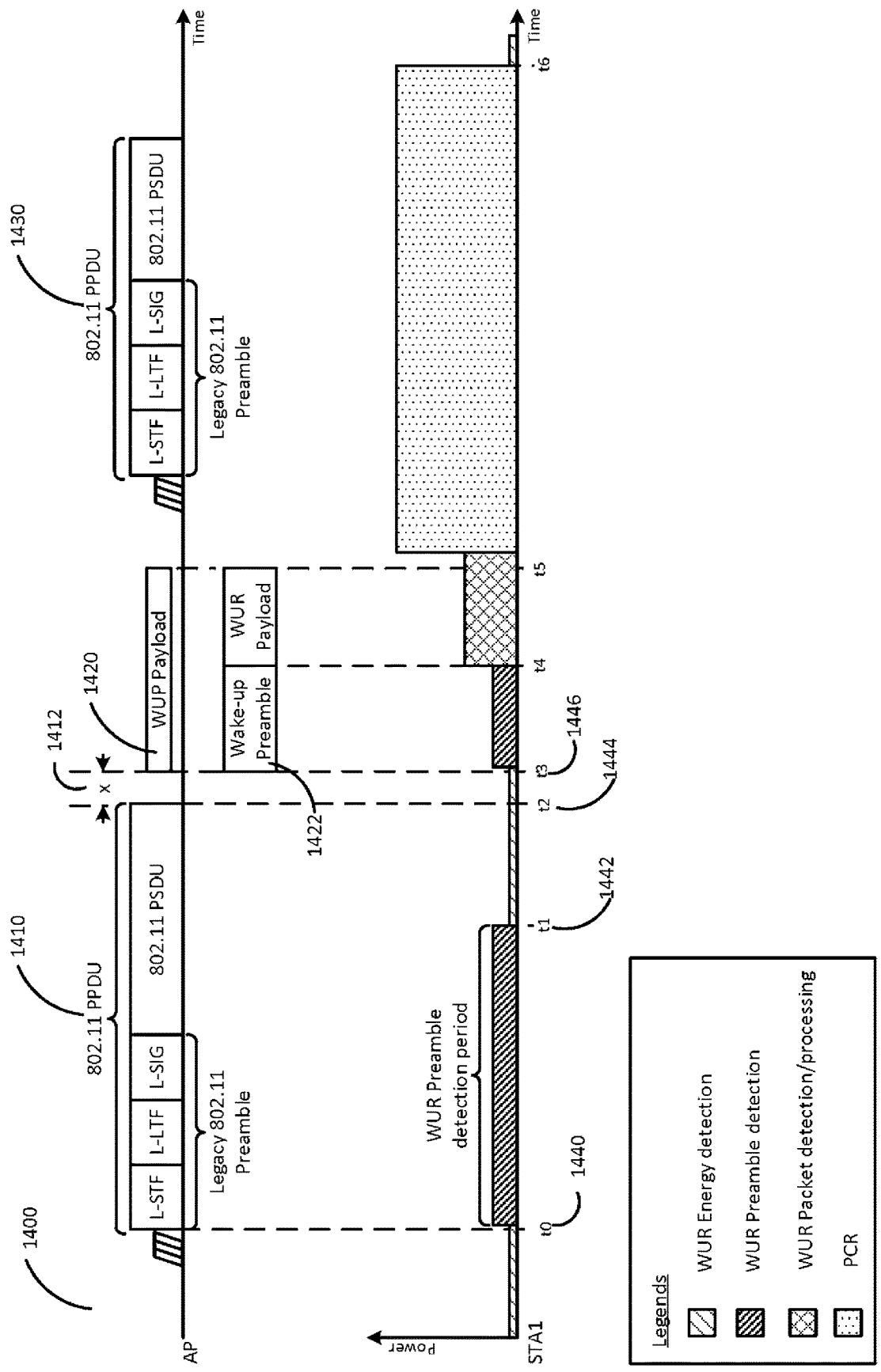
[Fig. 14]

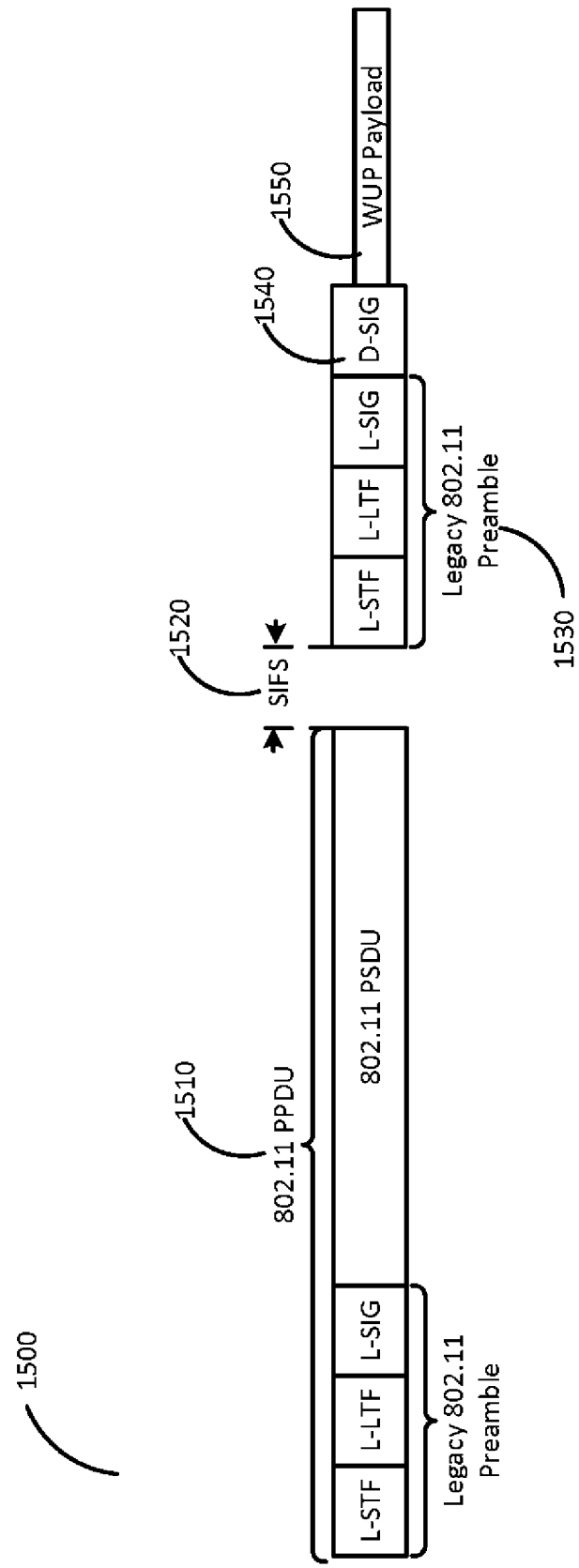
[Fig. 15]

[Fig. 16]
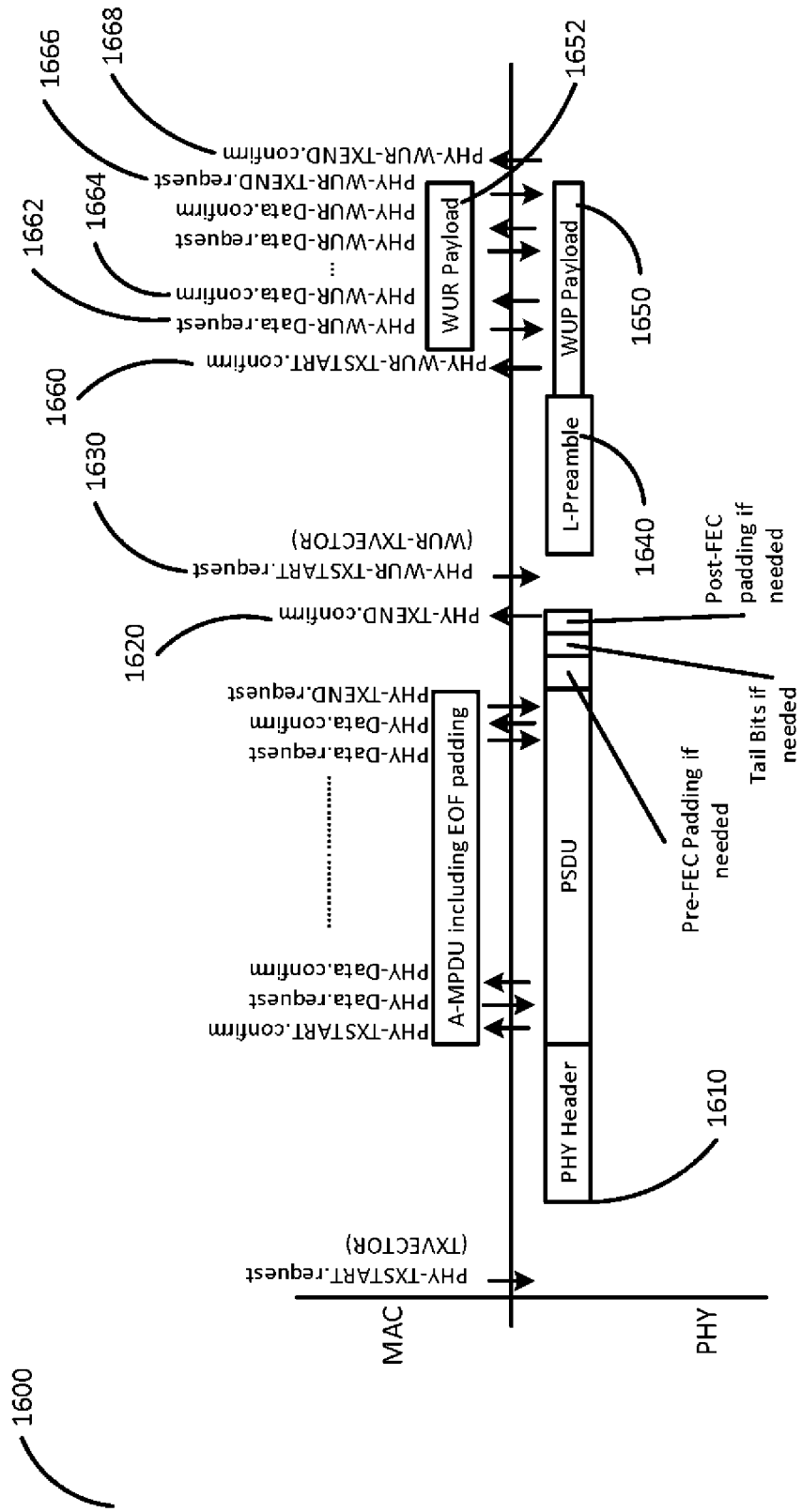

[Fig. 17]
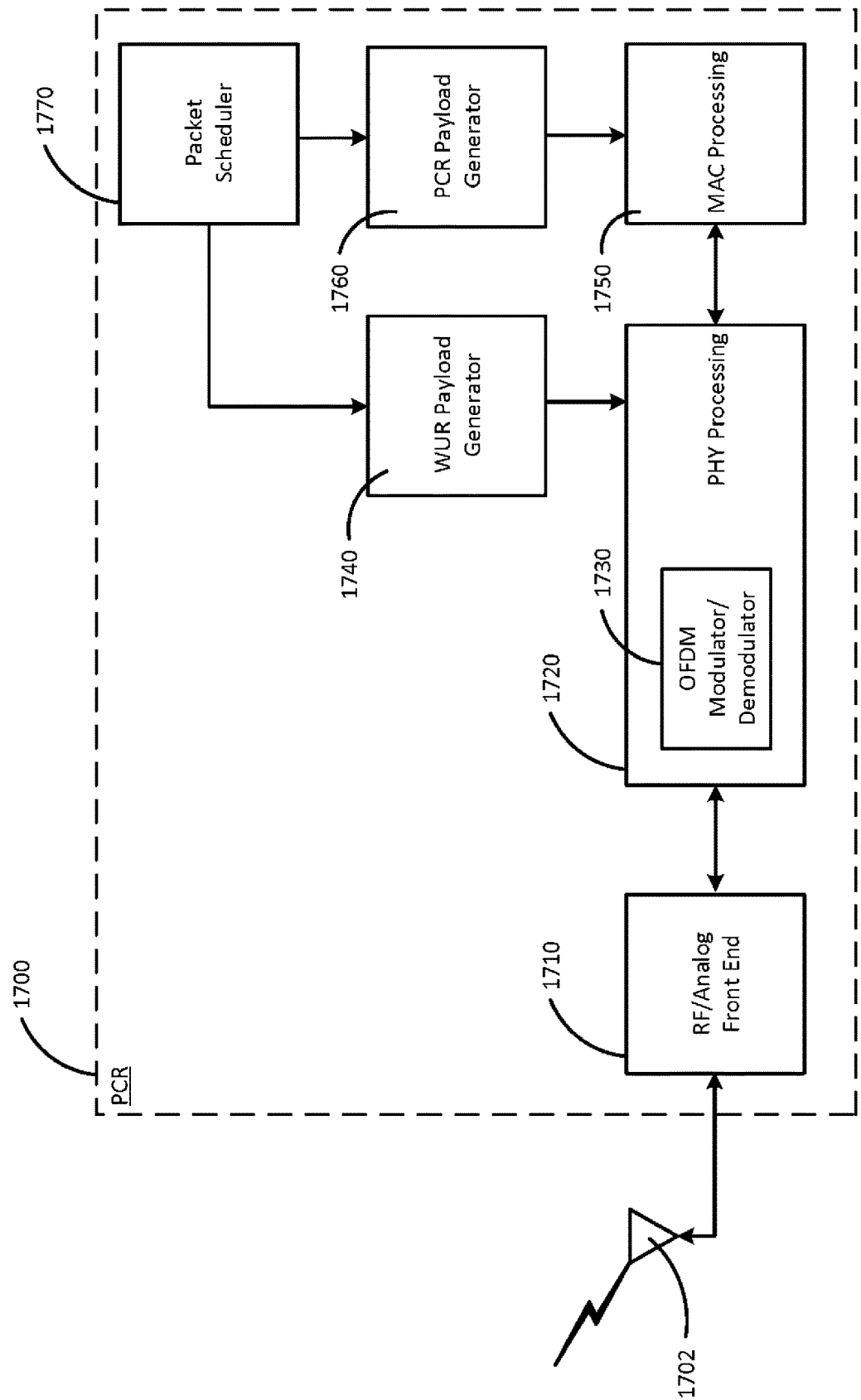

[Fig. 18]
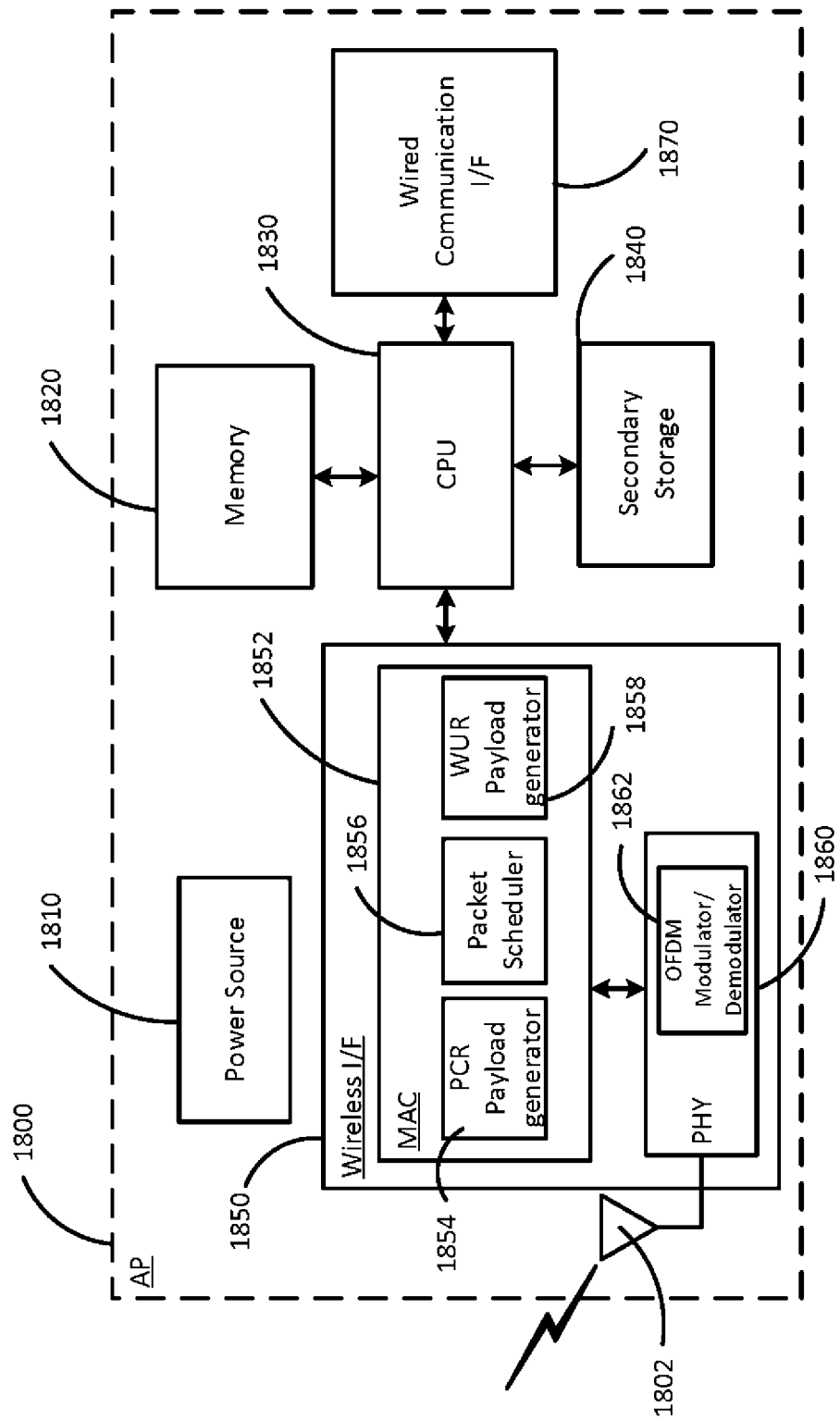

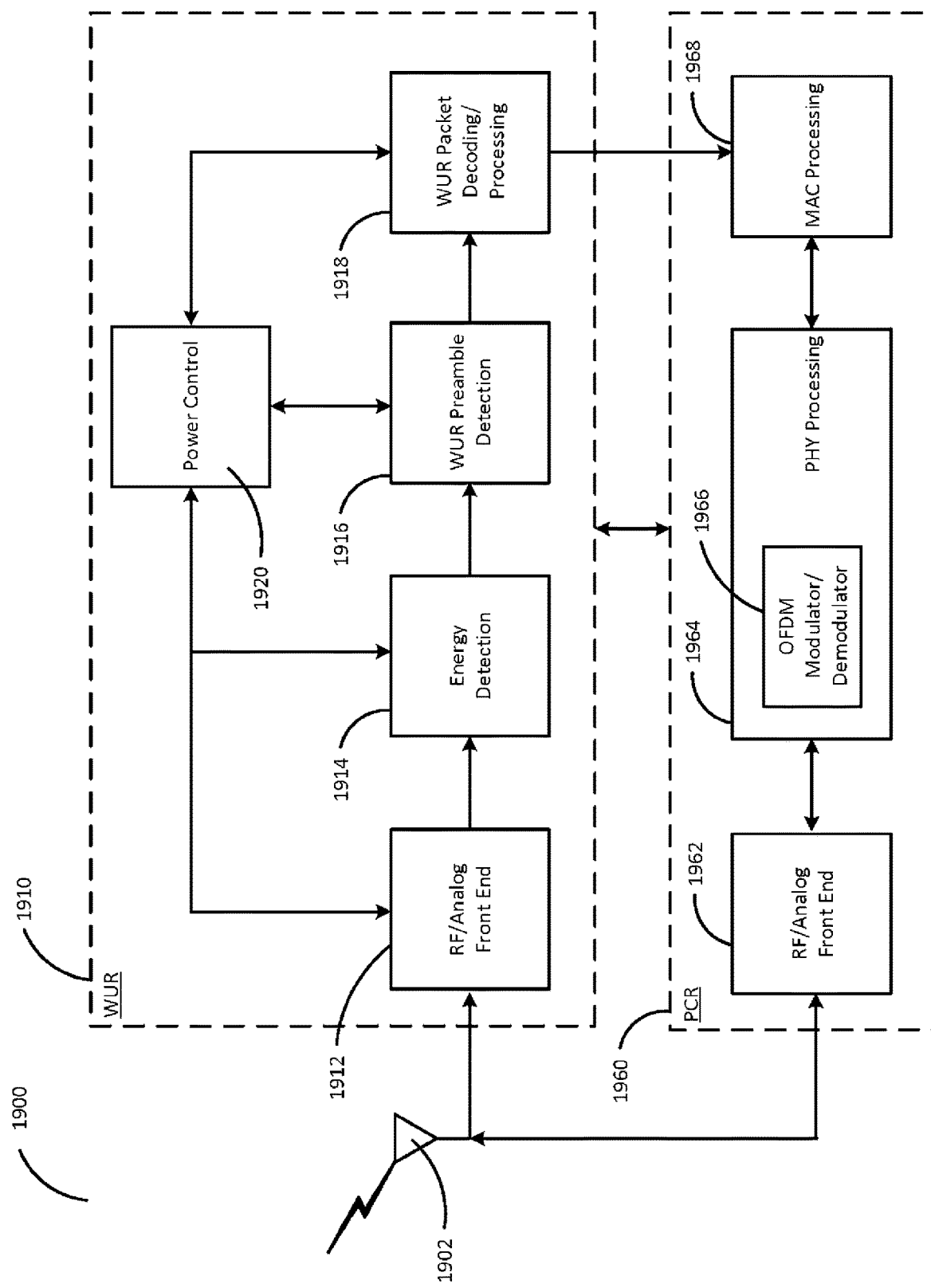
[Fig. 19]

[Fig. 20]
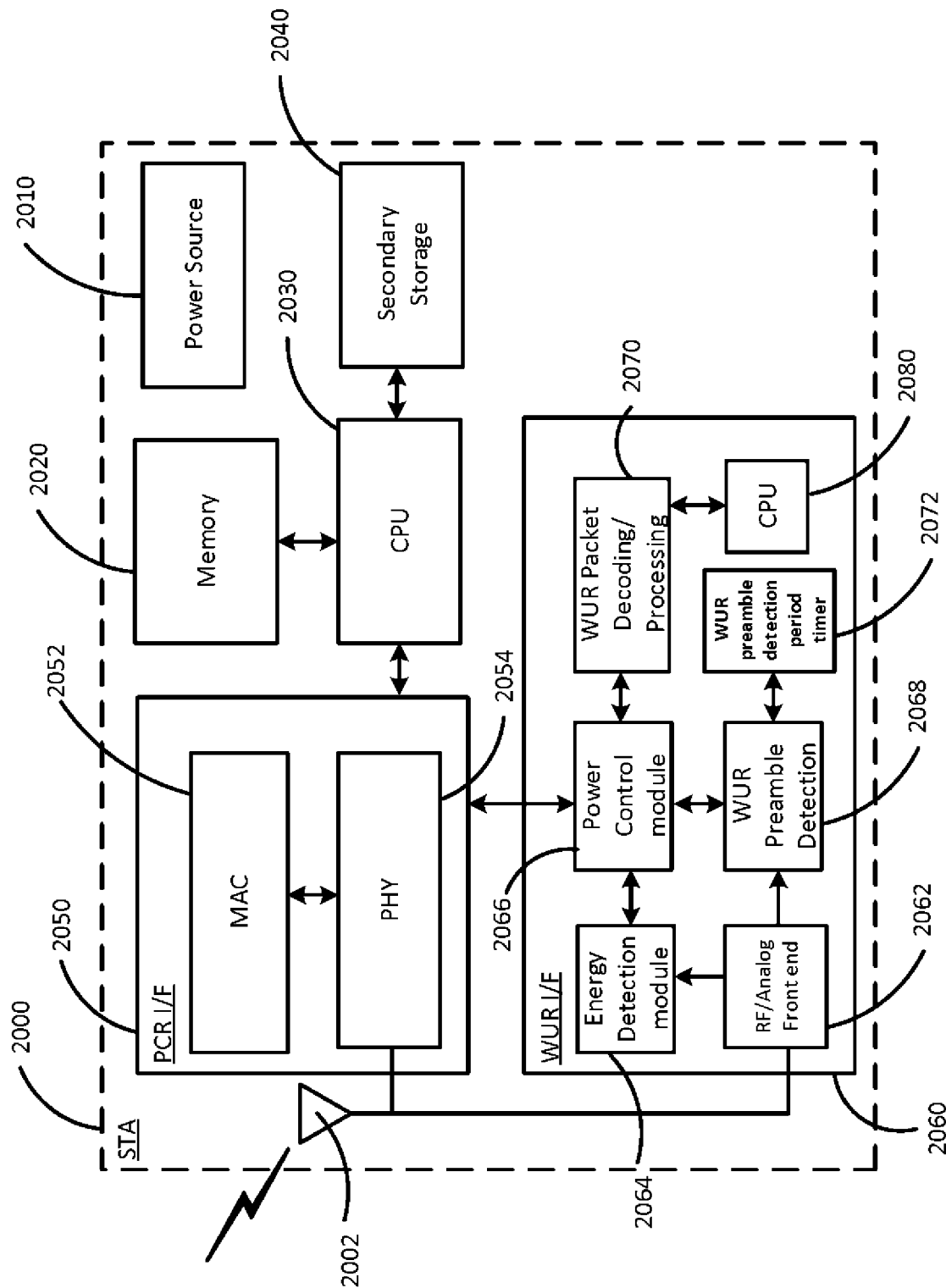

COMMUNICATION APPARATUS AND METHOD

CROSS-REFERENCE TO RELATED APPLICATIONS

This application is a U.S. national stage application of the PCT International Application No. PCT/JP2018/019004 filed on May 17, 2018, which claims the benefit of foreign priority of Japanese patent application 2017-133120 filed on Jul. 6, 2017, the contents all of which are incorporated herein by reference.

TECHNICAL FIELD

The present disclosure is generally related to a communication apparatus and a communication method.

BACKGROUND ART

The IEEE (Institute of Electrical and Electronics Engineers) 802.11ba Taskgroup is currently in the process of standardizing wireless communication technologies related to the operations of a wake-up radio (WUR) apparatus. The WUR apparatus is a companion radio apparatus to the primary connectivity radio (PCR) apparatus and coexists with legacy IEEE 802.11 devices in the same frequency band. The PCR may be any of the existing mainstream IEEE 802.11 amendments (802.11a, 802.11g, 802.11n or 802.11ac) or even other applicable future amendments (e.g. 802.11ax). The purpose of the WUR apparatus is to trigger the transition of the PCR apparatus out of sleep upon reception of a valid wake-up packet, while the PCR is used as the primary wireless communication radio. The PCR apparatus is only turned on during active communication, while during period of idle listening, the PCR apparatus is turned off and only the WUR apparatus is operating. The WUR apparatus is expected to have active receiver power consumption less than one milliwatt, which is much lesser compared to the active receiver power consumption of the PCR apparatus. Devices with a WUR apparatus may be called WUR devices and WUR mode may refer to operation mode where only the WUR is in operation while the PCR is turned off.

The IEEE 802.11ba amendment is targeted at applications and Internet-of-Things (IOT) use cases in which the communication devices are usually powered by a battery and it is highly desirable to extend the battery lifetime while maintaining reasonably low latency.

CITATION LIST

Non Patent Literature

[NPL 1] IEEE Std 802.11-2016
[NPL 2] IEEE 802.11-17/0575r1, Specification Framework for TGba, May 2017
[NPL 3] IEEE 802.11-16/0722r1, "Proposal for Wake-Up Receiver (WUR) Study Group"
[NPL 4] IEEE 802.11-17/0343r3, "WUR Beacon"
[NPL 5] IEEE 802.11-17/0342r4, "WUR Negotiation and Acknowledgment Procedure Follow Up"

SUMMARY OF INVENTION

How to reduce overheads associated with transmission of WUR packets has not been fully studied.

One non-limiting and exemplary embodiment of the present disclosure facilitates reducing the overheads associated with transmission of WUR packets.

Solution to Problem

In one general aspect, the techniques disclosed here features: a first payload generator configured to generate payload of a packet of a first signal type; a second payload generator configured to generate payload of a packet of a second signal type; a packet scheduler that controls the transmission timings of the first and the second packet; and a transmitter which, in operation, transmits, under the timing control of the packet scheduler, the packet of the first signal type followed by the packet of the second signal type.

These general and specific aspects may be implemented using a device, a system, a method, and a computer program, and any combination of devices, systems, methods, and computer programs.

The communication apparatus and communication method described in the present disclosure can facilitates reducing the overheads associated with transmission of wake-up signals in mixed radio environment in which the wireless signals are modulated in two or more modulation schemes.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 1 shows an example heterogeneous 802.11 wireless network with a mixture of legacy 802.11 devices and WUR capable devices.

FIG. 2 shows the format of WUR packets being considered in the 802.11ba Taskgroup.

FIG. 3 depicts a frame transmission sequence that involves transmission of a mixture of 802.11 frames and WUR packets.

FIG. 4 shows the transmission scheme as per the first embodiment.

FIG. 5 shows a specific example of the transmission format as per the first embodiment.

FIG. 6 depicts a frame transmission sequence for a specific example of the transmission scheme as per the first embodiment.

FIG. 7 shows the format of the WUR Action frame and the WUR Capabilities element.

FIG. 8 depicts the multi-stage receiver operation as per the first embodiment.

FIG. 9 is a flowchart of the multi-stage receiver operation.

FIG. 10 shows a table of the PHY SAP Primitives used for transmission of WUR packets.

FIG. 11 shows a table of the parameters of the Vectors used in the PHY SAP Primitives used for transmission of WUR packets.

FIG. 12 depicts the use of PHY SAP Primitives for the transmission scheme as per the first embodiment.

FIG. 13 shows the transmission scheme as per the second embodiment.

FIG. 14 depicts the multi-stage receiver operation as per the second embodiment.

FIG. 15 shows the transmission scheme as per the third embodiment.

FIG. 16 depicts the use of PHY SAP Primitives for the transmission scheme as per the third embodiment.

FIG. 17 is a simplified block diagram of an example AP that implements the disclosed transmission scheme.

FIG. 18 is a detailed block diagram of an example AP that implements the disclosed transmission scheme.

FIG. 19 is a simplified block diagram of an example WUR STA that implements the disclosed transmission scheme.

FIG. 20 is a detailed block diagram of an example WUR STA that implements the disclosed transmission scheme.

DESCRIPTION OF EMBODIMENTS

The present disclosure can be better understood with the aid of following figures and embodiments. The embodiments described here are merely exemplary in nature and are used to describe some of the possible applications and uses of the present disclosure and should not be taken as limiting the present disclosure with regard to alternative embodiments that are not explicitly described herein.

The present disclosure is targeted at reducing the overheads associated with transmission of wake-up signals in mixed radio environment in which the wireless signals are modulated in two or more modulation schemes. As an example, the following scenario may be considered: A WUR device is expected to be operating in WUR mode for long stretches of time in order to maximize its battery life. During the WUR mode, the WUR device is not able receive any 802.11 frames and as such may slowly lose clock synchronization with the Access Point (AP) with which it is associated. To mitigate such clock drifts, it is beneficial to have the AP transmit WUR packets carrying some sort of timing information at regular interval of time. However, frequent transmission of such packets will lead to an increase in the network congestion due to the overhead associated with transmission of WUR packets.

FIG. 1 shows an example of a wireless communication network 100 in which the present disclosure may be applied. The wireless communication may be based on popular wireless standards such as IEEE 802.11. The wireless communication network 100 may consist of an Access Point (AP) 110 and three stations (STA) 120, 130 and 140 associated with the AP 110. The AP 110 is equipped with a Primary Connectivity Radio (PCR) 112 which is capable of transmitting and receiving wireless signals in the 802.11 waveform (e.g. Orthogonal Frequency Division Multiplexing (OFDM)) as well as being capable of transmitting wireless signals in the Wake-up radio (WUR) waveform (e.g. On-Off Keying (OOK)). STA 120 is a legacy 802.11 device that is only equipped with a PCR 122 capable of transmitting and receiving 802.11 signals whereas STAs 130 and 140 are both WUR capable STAs and are equipped with PCRs 132 and 142 respectively as well as Wake-up radio receivers (WURx) 134 and 144 respectively. STAs 130 and 140 are capable of transmitting and receiving 802.11 signals and are also capable of receiving WUR signals. The PCRs 132 and 142 may only be turned on during active communication (PCR mode), while during period of idle listening, the PCRs may be turned off and only the WURx 134 and 144 may be operating (WUR mode). When the AP 110 needs to communicate with STAs operating in WUR mode, it may first transmit wake-up signal to instruct the STAs to transit to PCR mode by turning on the respective PCRs and switching off the WURx. Subsequently the AP and the STAs may perform communication over the PCR. Once the communication is over, the STAs may switch back to WUR mode by switching off the PCR and turning on the WURx.

FIG. 2 shows the wake-up signal transmission scheme being considered in the IEEE 802.11ba Taskgroup. The wake-up signal may be represented as the wake-up packet (WUR packet) 200. The WUR packet 200 is composed of two distinct portions. The first portion is a 20 MHz legacy (also known as non-high-throughput (HT)) 802.11 preamble 210 and a dummy OFDM symbol 218, which are transmitted in the 802.11 OFDM waveform over the entire 20 MHz channel The second portion is the wake-up packet (WUP) payload 220 which is transmitted in a WUR OOK waveform in a narrower sub-channel within the 20 MHz channel, for example a 4 MHz sub-channel. Although only a single WUP Payload 220 is shown in FIG. 2, it is also possible that more than one, for example, three WUP Payloads are transmitted on different, nonoverlapping sub-channels within the 20 MHz channel.

The legacy 802.11 preamble 210 provides coexistence with legacy 802.11 STAs that do not understand the WUR signals. Preamble 210 further comprises a non-HT Short Training Field (L-STF) 212, a non-HT Long Training Field (L-LTF) 214 and a non-HT SIGNAL field (L-SIG) 216. The L-SIG 216 carries information regarding the length of the WUP payload 220, allowing legacy 802.11 devices to defer their transmissions for the correct duration. A dummy 20 MHz OFDM symbol 218 of duration 4 micro-seconds modulated in Binary Phase Shift Keying (BPSK) is transmitted right after the L-SIG 216 to prevent 802.11n devices from wrongly decoding the WUR packet 200 as being an 802.11n packet.

The WUP Payload 220 carries the actual wake-up signal and comprises a wake-up preamble 222 and a WUR payload 224. The wake-up preamble 222 is used for automatic gain control (AGC), timing synchronization, packet detection etc., while the WUR payload 224 carries the control information. The WUR payload 224 may also be known as a WUR frame and may be further composed of various sub-fields such as frame Type, Network identity, Transmitter identity, Receiver identity, Frame check sequence (FCS) as well as other control information depending on the frame Type.

As mentioned earlier, in order to minimize the clock drift of STAs operating in WUR mode, it is beneficial to have the AP transmit WUR packets carrying some sort of timing information at regular interval of time. Such specialized WUR packets may be called WUR Beacons. In addition, WUR Beacons may also comprise additional fields useful for all WUR STAs and may also be used for AP discovery, or as keep-alive WUR signals for WUR STAs to maintain association with the AP and so on.

FIG. 3 illustrates a frame transmission sequence 300 showing regular transmission of the 802.11 Beacon frames as well as the WUR Beacon frames by the AP 110. The 802.11 Beacon frames 320 are transmitted at regular intervals called the Beacon Interval 330 and carry vital information about the wireless network 100. The WUR Beacons 340 are also transmitted at regular intervals called WUR Beacon Interval 350. As per the 802.11 channel access rules, the transmission of the 802.11 Beacon 320 as well as the WUR Beacon 340 are preceded by a time varying contention period 310 with a time duration that generally increases along with the increase in network traffic. The contention period 310 is consisted of a deterministic component called Interframe Space (IFS) and a random component called backoff slots. Also, as shown in FIG. 2, if the WUR Beacon is transmitted in the WUR packet format 200, there is an additional overhead due to the OFDM transmission made up of the legacy 802.11 preamble 210 and the D-SIG 218, which together make up 24 micro-seconds. Even though it is beneficial for the WUR STAs to receive WUR Beacons frequently, the overheads of the contention period and the OFDM transmission may cause the AP to transmit the WUR Beacons at a much larger interval as compared to the Beacon Interval 330. It should be noted that WUR Beacons are just an example and the reduction in transmission overheads is beneficial to other WUR packets as well.

Based on the above knowledge, the inventors of this application have reached the present disclosure. The present disclosure discloses a communication apparatus and a communication method that can facilitates reducing the overhead associated with the transmission of wake-up signals in a mixed radio environment in which the wireless signals are modulated in two or more modulation schemes.

Several exemplary embodiments are described in detail in later sections to describe the disclosure in detail. The various embodiments for the reduction of transmission overheads as per the present disclosure are described in detail in the following sections.

First Embodiment

As mentioned earlier, there are two major sources of overhead associated with the transmission of WUR packets in the proposed format 200 of FIG. 2. One is the channel contention overhead corresponding to the contention period 310 in FIG. 3 and the other is the overhead due to the OFDM transmission made up of the legacy 802.11 preamble 210 and the D-SIG 218 shown in FIG. 2. Even though the channel contention procedure is an integral part of the 802.11 channel access mechanism, in severe cases where there are very high volume of ongoing traffic, transmission of WUR packets may suffer long delays or may even fail to gain access to the medium during the channel contention. Also, as noted earlier, the primary purpose of transmitting a legacy 802.11 preamble 210 in FIG. 2 as the first portion of the WUR packet is to provide coexistence with legacy 802.11 STAs that do not understand the WUR signals. Similarly the D-SIG field 218 is transmitted in OFDM to spoof other third party 802.11 devices. Both of these fields do not carry any information for the WUR STAs.

Referring to FIG. 4, both of the above mentioned overheads can be eliminated if the WUP Payload is transmitted as shown in the transmission scheme 400. Instead of transmitting the WUP Payload 420 as an independent WUR packet 200 as shown in FIG. 2, the WUP Payload 420 is piggybacked to another 802.11PHY protocol data unit (PPDU) 410. The 802.11 PPDU 410 can be any 802.11 packet that is scheduled for transmission close to the transmission time of the WUP Payload 420. As an example, the 802.11 PPDU 410 may be a non-high-throughput (non-HT) PPDU and comprises a legacy 802.11 preamble 412 and an 802.11 PHY Service Data Unit (PSDU) 414. Although not shown in FIG. 4, the 802.11 PPDU 410 may also include tail bits, padding bits etc. right after the 802.11 PSDU 414. Alternatively, depending on the 802.11 device type, the 802.11 PPDU 410 may also be a high-throughput (HT) PPDU, or a very high throughput (VHT) PPDU or a high efficiency (HE) PPDU. If the 802.11 PPDU 410 is not in non-HT format, it may include additional preambles in between the legacy 802.11 preamble 412 and the 802.11 PSDU 414, for example an HT preamble in an HT PPDU or a VHT preamble in a VHT PPDU or an HE preamble in an HE PPDU respectively. As per the disclosed transmission scheme, immediately upon the end of the transmission of the 802.11 PPDU 410, the WUP Payload 420 is transmitted in the WUR waveform (for example OOK). The WUP Payload 420 is the same as the WUP Payload 220 in FIG. 2 and is comprised of the wake-up preamble 422 and a WUR payload 424.

FIG. 5 shows a specific example 500 of the proposed transmission scheme. As introduced earlier in FIG. 3, a WUR capable AP may transmit a special type of WUR packets called WUR Beacons at regular intervals to allow WUR STAs to maintain tight time synchronization with the AP. In order to reduce the overheads, the WUR Beacons could be piggybacked to selected 802.11 Beacons that are also transmitted regularly by the AP.

Alternatively, a new type of WUR Packets called WUR SYNC, which may be seen as a sub-type of WUR Beacons could be defined. The WUR SYNC packet 520 in FIG. 5 is purpose built to reduce the clock drift problems faced by WUR STAs that may operate in the WUR mode for long stretches of time. The WUR SYNC 520 may carry only those fields that are necessary for time synchronization. Such fields include: the wake-up preamble 522 used for detection of a WUR Packet, the Type field 524 to indicate the WUR packet type, the TID field 526 to identify the transmitter of the WUR Packet, the partial-TSF (P-TSF) field 528 carrying selected bits of the Time Synchronization Function (TSF) maintained by the AP, and the Frame Check Sequence (FCS) field 530 for error detection/correction of the bits in the WUR payload. It may also be possible that some of the fields are absent, for example if the wake-up preamble 522 uses the identity of the AP, or the Basic Service Set (BSS) Color as the signature sequence field, the TID field 526 need not be present. If the WUR SYNC is very compact and it is piggybacked to the 802.11 Beacon frame 510, it can be transmitted much more frequently.

In 802.11 wireless networks, the 802.11 Beacon frames 510 are normally transmitted in non-HT PPDU format. In non-HT PPDUs, the L-SIG field of the legacy 802.11 preamble 512 is used to indicate the length of the payload portion of the PPDU 510 that carries the Beacon frame. This information is used by 802.11 STAs to correctly receive the Beacon frame comprising the MAC header 514 and the payload 518. However, the legacy preamble 512 is not able to protect the piggybacked WUR packet, WUR SYNC in this example, from legacy 802.11 STAs since the STAs may not be aware that there is going to be continued transmission after the end of the PPDU 510.

One way of protecting the WUR SYNC packet 520 is to include the estimated transmission time of the WUR SYNC packet in the Duration field 516 of the MAC Header 514. Upon receiving the PPDU 510 carrying the 802.11 Beacon, an 802.11 STA updates its Network Allocation Vector (NAV) counter with the value of the Duration field 516 and as per the 802.11 virtual channel sensing rule. According to this rule, the STA is not allowed to transmit anything as long as the NAV counter is nonzero. If the host PPDU, i.e. the 802.11 PPDU to which the WUR packet is piggybacked, is transmitted in HT PPDU format, the actual length of the PPDU payload is indicated in the HT-SIG1 field of the HT preamble. In such cases, the piggybacked WUR packet can be protected by setting the L-SIG field of the legacy preamble 512 to a value that indicates the time till the end of the piggybacked WUR SYNC packet. If the host PPDU is transmitted in VHT PPDU format or HE PPDU format, similar to non-HT PPDUs, the Duration field 516 of the MAC Header 514 can be used to protect the piggybacked WUR packet. Yet another protection method, assuming that the size of the piggybacked WUR packet is fixed and known in advance to all 802.11 STAs in the wireless network 100, is to use one bit (Piggyback bit) in the MAC header 514 to indicate the presence of a piggybacked WUR packet. A compliant 802.11 STA that receives the host PPDU 510 will be made aware of the presence of the piggybacked WUR packet 520 by the Piggyback bit and will defer transmission till the end of the WUR packet 520.

FIG. 6 illustrates a sequence of frame transmission as an example of how the present disclosure may be used for the transmission of piggybacked WUR SYNC packets. The contention delay is represented as 610 and precedes all independent transmissions. The WUR capable AP 110 transmits 802.11 Beacon frames 620 in regular intervals called Beacon Interval 630, which is usually set to 100 milliseconds in normal deployment scenarios. The expected transmission time of Beacon frames 620 is known as Target Beacon Transmission Time (TBTT) and is known to all the STAs associated with the AP. The 802.11 Beacon frames are targeted at STAs operating in PCR mode. The AP 110 also transmits WUR Beacon packets 640 at intervals called WUR Beacon Interval 634, which may be much larger than the Beacon Interval 630, for example 10 seconds. The AP may advertise the WUR Beacon Interval 634 in common frames such as the Beacon frame, or the WUR STA may be informed of it during negotiation of WUR mode. The WUR Beacon packets are targeted at STAs operating in WUR mode.

At some of the TBTTs, the AP may also decide to transmit 802.11 Beacon frames with piggybacked WUR SYNC packets 650. Such piggybacked WUR SYNC packets may be transmitted as frequently as required or may also be transmitted at regular intervals called SYNC interval 632. Due to lesser overheads of transmitting piggybacked WUR SYNC packets, the SYNC interval 632 may be much smaller than WUR Beacon Interval 634, for example 1 second or even 200 milliseconds i.e. every other 802.11 Beacon frame carries a piggybacked WUR SYNC packet 650. At times it may not be conducive for the AP to transmit a piggybacked WUR SYNC packet 650, and it may instead transmit the WUR Beacon packet 640 following channel access contention.

The AP 110 may implement a Packet Scheduler 1770 as shown in FIG. 17 that makes the decision whether to transmit WUR packets using transmission scheme 200 in FIG. 2 or to transmit using the piggybacked transmission scheme 400 in FIG. 4. How the Packet Scheduler 1770 makes the decision when to piggyback a WUR Packet may depend on many factors such as the number of associated WUR STAs that require frequent time synchronization with the AP, the total BSS load, the frequency and packet length of the host 802.11 packet etc. For the example in FIG. 6, the Packet Scheduler 1770 may decide when to piggyback a WUR packet based on:

1. Length of the host 802.11 packet: for example if the 802.11 Beacon frame 620 is less than a certain threshold value (e.g. 800 µS), the AP transmits the piggybacked WUR SYNC packet 650 along with the Beacon frame.

2. Total length of the piggybacked packet: e.g. if the total transmission time of the 802.11 Beacon packet 620 plus the piggybacked WUR SYNC packet 650 is less than a certain threshold value (e.g. 1000 µS), the AP transmits the piggybacked WUR SYNC packet 650 along with the Beacon frame.

3. If the BSS load is high and the WUR SYNC packet needs to be transmitted frequently (for example every other Beacon Interval), the AP transmits piggybacked WUR SYNC packets along with every other Beacon frame in order to save the contention overhead.

4. STA's WUR operating mode: the packet scheduler may also take into consideration factors such as WUR STA's operating mode (for example WUR STAs operating in duty cycle mode may not require frequent WUR SYNC packets), or WUR operating parameters (for example WUR STAs with very low TSF resolution may require very frequent WUR SYNC packets) etc.

The Packet Scheduler 1770's decision to transmit piggybacked WUR Packets may also depend on WUR STAs' capabilities. FIG. 7 shows the format of the frame body of a WUR Action frame 700 that may be used to negotiate WUR mode between AP 110 and WUR capable STAs using the PCR. Action frames are a sub-category of 802.11 management frames and are usually used for negotiation (for example ADDBA, WNM etc.). WUR Action frames called "WUR Request frame" may be defined for WUR STAs to initiate WUR negotiation with the AP. Similarly, WUR Action frames called "WUR Response frame" may be defined for the AP to response to such requests.

Aside from the Category field, WUR Action field and the Dialog Token field, the WUR Action frame may include a WUR Mode element 710, a WUR capabilities element 712 as well as other elements. The WUR Mode element field 710 may be used to carry the WUR information relevant to WUR mode negotiation such as the STA's wake-up delay (defined as the time required for the STA to switch to PCR mode upon receipt of a wake-up packet), or parameters related to duty cycle mode etc. The WUR Capabilities element 712 may be used by the STAs and AP to indicate their WUR capabilities. The "Rx/Tx of piggybacked WUR packets" bit 730 of the WUR Capabilities field 720 may be used to indicate an AP's ability to transmit or a STA's ability to receive a piggybacked WUR packet.

If a STA indicates that it is capable of receiving piggybacked WUR packet, it may also include the "WUR Preamble detection period" field 740 if the STA implements a multi-stage wakeup receiver architecture. The "WUR Preamble detection period" refers to a period of time that a WUR STA that implements a multi-stage wake-up receiver architecture, attempts to search for a valid WUR preamble upon receiving wireless signals of sufficient energy when the STA is operating in WUR mode. Alternatively, the WUR Capabilities element 712 may also be carried in the 802.11 Beacon frames, 802.11 Association frames etc. An AP may transmit a piggybacked WUR packet to a STA only if it is indicated that the STA is capable of receiving a piggybacked WUR packet in the WUR capabilities field 720.

One example of a multi-stage wakeup receiver architecture is disclosed in FIG. 19. A WUR STA 1900 is equipped with two separate radios: a PCR apparatus (hereinafter stated simply as "PCR") 1960 for transmitting and receiving 802.11 OFDM signals and a WUR apparatus (hereinafter stated simply as "WUR") 1910 for receiving WUR signals. The WUR 1910 implements a three-stage wakeup architecture and is made up of several sub components such as an RF/Analog Front End 1912, an Energy Detection module 1914, a WUR Preamble Detection module 1916, a WUR Packet Decoding/Processing module 1918 and a Power Control module 1920.

The RF/Analog Front End 1912 is responsible for receiving the analog radio signals from the antenna 1902. The Energy Detection module 1914 is responsible for observing the signal strength of the received signals. The WUR Preamble Detection module 1916 is responsible for detecting and decoding the preamble portion of the wake up signal.

The WUR Packet Decoding/Processing module 1918 is responsible for decoding and processing the payload portion of the wakeup signal. And lastly, a Power Control module 1920 is responsible for managing the power states of the rest of the modules. The Energy Detection module 1914 may also be used as an OOK demodulator. Out of these sub-components, only the WUR Packet Decoding/Processing module 1918 may need to use a central processing unit (CPU) while the rest of the sub-components may be implemented in hardware to save power.

When a WUR STA 1900 is operating in the WUR mode, three distinct operation stages may be defined according to the power consumption levels.

In the first stage, called the WUR Energy Detection stage, only the RF/Analog Front End 1912, Energy Detection module 1914, the Power Control module 1920 and just the most essential components such as a clock oscillator are operating in the active state while the WUR Preamble Detection module 1916 and the WUR Packet Decoding/Processing module 1918 are turned off. In this mode, the WUR STA consumes the least amount of power.

In the second stage, called the WUR Preamble Detection stage, the WUR Preamble Detection module 1916 is in active state while the WUR Packet Decoding/Processing module 1918 is turned off.

In the third stage, called the WUR Packet Decoding/Processing stage, the WUR Packet Decoding/Processing module 1918 is in active state while the Energy Detection module 1914 and the WUR Preamble Detection module 1916 may be turned off. Since the WUR Packet Decoding/Processing module 1918 may make use of a CPU, this stage would be the most power consuming of the three stages.

The operation of the disclosed multi-stage wakeup receiver may be better explained with the flowchart 800 in FIG. 8. In the first stage (WUR Energy Detection stage), when a WUR STA is operating in the WUR idle listening mode, to further save power, only the RF/Analog Front End 1912, the Energy Detection module 1914, the Power Control module 1920 and other essential components are in the active state while the rest of the modules are in stand-by mode in which they draw very little power. At step 810, the Energy Detection module 1914 continuously observes the energy level of the signal received from the RF front end and when a sharp change in the energy level is detected, the Power Control module 1920 is alerted, and the process enters the second stage and moves to step 820.

At step 820 in the second stage (WUR Preamble Detection stage), the Power Control module 1920 turns off the Energy Detection module 1914 and activates the WUR Preamble Detection module 1916 and the process moves to step 822. At step 822, the WUR preamble detection period timer is started with the timer value set to the value of the STA's "WUR preamble detection period" and the process moves to step 824. At step 824, if the WUR Preamble detection module 1916 detects that the received WUR signal contains a valid WUR Preamble within the "WUR preamble detection period", the process enters the third stage and moves to step 830, else the process moves to step 826. At step 826 the Power Control module 1920 turns off the WUR Preamble Detection module 1916 and the process moves to step 828. A valid WUR Preamble refers to a preamble that carries fields such as the signature sequence field that matches the signature sequence assigned to the BSS or to the WUR STA.

At step 830 in the third stage (WUR Packet Decoding/Processing stage), the Power Control module 1920 stops the WUR preamble detection period timer, turns off the WUR Preamble Detection module 1916 and activates the WUR packet Decoding/Processing module 1918 and the process moves to step 832. At step 832, the WUR packet Decoding/Processing module 1918 decodes the payload portion of the WUR packet and may perform such checks as ensuring the FCS is valid, determining if the packet is transmitted by its AP, and further determining if the STA is included as one of the recipients of the WUR packet and so on. If it is determined that the WUR packet is valid and is destined for the STA, the WUR packet Decoding/Processing module 1918 may also update its local clock based on the P-TSF field carried by the WUR packet if any. Finally if it is determined that the WUR packet requires the STA to change to PCR mode, the process moves to step 840, else the process moves to step 834. At step 834 the Power Control module 1920 turns off the WUR packet Decoding/Processing module 1918 and the process moves to step 828. At step 828, the Power Control module 1920 activates the Energy Detection module 1914 and the WUR goes back to the first stage and observes the energy level of the received signal.

At step 840, the WUR 1910 proceeds to send the activation signal to the PCR 1960 and turns itself off and the process ends. The Power Control module 1920 may further turn off the RF/Analog Front End 1912, the Energy Detection module 1914, the WUR Preamble detection module 1916 and the WUR packet Decoding/Processing module 1918 during a PCR operation period or during a sleep period in a duty cycle mode operation.

FIG. 9 illustrates an example transmission/reception sequence 900 that demonstrates the operations of the multi-stage wake up receiver architecture 1910 and involves a WUR capable AP and two STAs operating in WUR mode. The horizontal axis represents the time domain, while the vertical axis represents the power consumed by the WUR STAs in various stages. Initially, both STA1 and STA2 are operating in the first stage (the WUR Energy Detection stage) and are continuously observing the energy level of the medium as shown by 960 in FIG. 9.

At time t0 (also indicated as 940 in FIG. 9), the AP starts transmission of an 802.11 PPDU 910 that carries a piggy-backed WUP Payload 920 that is addressed to WUR STA1. The Energy Detection module 1914 of both STA1 and STA2 detect the sharp change in energy level and enter the second stage (the WUR Preamble Detection stage) as shown by 962. In this stage, the WUR Preamble detection module 1916 of STAs attempts to detect a valid WUR preamble. As shown in FIG. 9, STA2 has a comparatively shorter WUR Preamble detection period 972 than the WUR Preamble detection period 970 of STA1.

At time t1 944, STA2's WUR Preamble Detection period timer 2072 expires and STA2 moves back to the WUR Energy detection stage until time t2 (indicated as 946 in FIG. 9) at which time the AP has finished transmitting the 802.11 PPDU 910 and starts the transmission of the WUP payload 920 in the WUR waveform. STA2 detects this as a sharp change in energy level and restarts its WUR Preamble detection module 1916. In the meanwhile, STA1 is continuously attempting to detect a WUR preamble from the received signal.

At time t3 (indicated as 948 in FIG. 9), the WUR Preamble detection modules 1916 of both STA1 and STA2 detect and verify the wake-up preamble 922 as being valid and enter the third stage (WUR Packet Decoding/Processing stage) as shown by 964. In this stage, the WUR Packet decoding/processing module of both STAs decode the WUR payload 924 and at time t4 (indicated as 950 STA1), it determines that the WUP payload 920 is destined for itself and as such activates its PCR and turns off its WUR, while STA2 determines that it is not a recipient of the WUP payload 920 and moves back to the WUR Energy detection stage. While in the PCR mode 966, the STA1 may receive an 802.11 PPDU 930 from the AP and transmit an acknowledgment frame if requested and subsequently turns off the PCR and moves back to WUR mode.

As seen in this example, the STAs are able to further save power during idle listening by implementing the three-stage receiver architecture. Also, the values the STAs choose for the WUR Preamble detection period impact the power consumed during the WUR preamble detection stage. Shorter values of the WUR Preamble detection period may be good in terms of power consumption, but the WUR preamble detection period has to be at least greater than the sum of a legacy 802.11 preamble and the wake-up preamble. However, shorter values may increase the risk of missing a piggybacked WUP Payload if the STA is not able to detect the difference in the energy level between the end of the 802.11 PPDU and the start of a WUP Payload. For example, there is a risk that STA2 may not be able to detect the start of the WUP Payload 920 at time t2 946.

The "WUR Preamble detection period" indicated by a STA during the WUR capabilities exchange may also influence an AP's decision to transmit a piggybacked WUR packet to the STA. For example, if the "WUR Preamble detection period" is longer than the transmission time of a host 802.11 frame, the AP can be reasonably sure that the STA will be able to receive the WUR packet piggybacked to the 802.11 frame. However if "WUR Preamble detection period" is shorter than the transmission time of a host 802.11 frame, the STA may turn off the WUR Preamble Detection module 1916 and go back to observing the energy level of the received signal and risk missing a piggybacked WUP Payload if the STA is not able to detect the difference in the energy level between the end of the 802.11 PPDU and the start of a WUP Payload. The "WUR Preamble detection period" indicated by a STA in its WUR Capabilities 720 may hence also be useful for the AP in deciding which 802.11 frame to use as a host frame to piggyback WUR packets.

Referring to FIG. 10, table 1000 lists the Physical layer (PHY) Service Access Points (SAP) used between the MAC layer and the PHY layer of the AP for the transmission of a WUR Packet or a WUR Payload. The PHY-WUR-DATA.request primitive takes DATA as parameter and is used to transfer an octet of the WUP payload data from the MAC sublayer to the local PHY entity. The PHYWUR-DATA.confirm primitive is issues by the PHY to the local MAC entity to confirm the transfer of the octet of WUR data from the MAC entity to the PHY. The PHY-WUR-TXSTART.request primitive takes WUR-TXVECTOR as parameter and is issued by the MAC sublayer to the PHY entity to request the transmission of a WUR packet. The WUR-TXVECTOR represents a set of parameters provided to the PHY entity in order to transmit the WUR Packet. In the case of piggybacked WUP Payload, the PHY-WUR-TXSTART parameter may be skipped and the parameters related to the transmission of the piggybacked WUP Payload may instead be transferred to the PHY in the TXVECTOR parameter of the PHY-TXSTART.request primitive used to request the transmission of the host 802.11 PPDU. The PHYWUR-TXSTART.confirm primitive is issued by the PHY to the local MAC entity to confirm the start of the transmission of a WUR Packet or a WUP Payload. It is issued once the PHY has transmitted the Wake-up preamble 422 of the WUP Payload 420 in FIG. 4. The PHY-WUR-TXEND.request is issued by the MAC sublayer to the PHY entity to request to end the transmission of the WUR Packet. The PHYWUR-TXEND.confirm is issued by the PHY to the local MAC entity to confirm the completion of the transmission of a WUR packet.

Table 1100 in FIG. 11 lists the parameters that are used for the transmission of a WUR Packet or a WUP payload. The first column lists the parameters while the associated parameter vectors that may carry them are listed in the second column. All the parameters except ADD-WUR may be carried in either TXVECTOR or WUR-TXVECTOR, while ADD-WUR may only be carried in TXVECTOR. ADD-WUR is used in the PHY-TXSTART.request primitive to indicate to the PHY whether a WUR packet or a WUP Payload is to be piggybacked to the PPDU being requested for transmission by the PHY-TXSTART.request primitive. There are three enumerated types defined for ADD-WUR as explained below:

ADD-WUR-NOGAP indicates that this PPDU is immediately followed by a payload portion of a Wake up Packet without any Interframe Space (IFS) or legacy preamble.

ADD-WUR-GAP indicates that this PPDU is followed by a payload portion of a Wake up Packet without legacy preamble after a gap of a fixed number of OFDM symbols.

NO-ADD-WUR indicates that no WUR packet follows this PPDU.

In case multiple formats of WUR packet are supported, the WUR_FORMAT parameter may be included in the TXCEVTOR or the WUR-TXVECTOR. WUR_FORMAT indicates the format of the WUR Packet and may take one of the following enumerated types:

WUR_SU indicates WUR Packet with a single WUP Payload.

WUR_MU indicates WUR Packet with multiple WUP Payloads; each WUP Payload address to a different WUR STA.

WUR_OFDMA indicates WUR Packet transmitted using OFDMA. The WUR_L_PREAMBLE parameter indicates to the PHY whether an 802.11 legacy preamble is transmitted immediately before the transmission of the WUP Payload. WUR_L_PREAMBLE may take one of the following enumerated types:

PRESENT indicates that an 802.11 legacy preamble is present immediately before the WUP Payload.

NOT_PRESENT indicates that an 802.11 legacy preamble is not present immediately before the WUP Payload.

The WUR_L_LENGTH parameter indicates the length of the WUP Payload that follows the 802.11 legacy preamble. This value is used to set the LENGTH field of the L-SIG of the 802.11 legacy preamble. The RATE field of the 802.11 legacy preamble is fixed as 6 Mb/s. The LENGTH and the RATE fields together indicate the transmission time of the WUP Payload. The parameter WUR_L_LENGTH is only present in the parameter VECTORs if WUR_L_PREAMBLE is set to PRESENT. The WUR_MODULATION parameter indicates the modulation used for the payload portion of the WUP Payload and may take one of the following enumerated types:

WUR_OOK indicates OOK modulation

WUR_BIPOLAR_OOK indicates Bipolar modulation

The WUR_LENGTH parameter indicates the length of the WUR Payload 424 (payload portion of WUP Payload) in FIG. 4 and is signaled in the Wake-up preamble 422 in FIG. 4.

The WUR_DATARATE parameter indicates the data rate of the WUR Payload 424 in FIG. 4 and is also signaled in the Wake-up preamble 422 in FIG. 4.

Referring to FIG. 12, 1200 illustrates the use of the PHY SAP primitives for the transmission of an example piggy-backed WUP Payload. The MAC entity instructs the PHY to start the transmission of a host 802.11 PPDU by issuing the PHY-TXSTART.request primitive 1202 that carries the parameter vector TXVECTOR 1204 which carries, aside from the parameters required for the transmission of the PSDU 1220, the parameters listed in table 1100 in FIG. 11 related to transmission of a piggybacked WUP Payload. In this example, the parameters are set as follows:

ADD-WUR: set to ADD-WUR-NOGAP
WUR_FORMAT: set to WUR_SU
WUR_L_PREAMBLE: set to NOT_PRESENT
WUR_L_LENGTH: not present
WUR_MODULATION: set to WUR_OOK
WUR_LENGTH: set to the length of the WUR Payload portion of the WUP Payload 1240.
WUR_DATARATE: set to the datarate used for the WUR Payload.

Depending on the PPDU format, the MAC also sets the Duration field in the MAC headers of the A-MPDU 1230, or the L_LENGTH parameter of the TXVECTOR1204 to account for the length of the piggybacked WUP Payload 1240. Once ready, depending on PPDU format, the PHY transmits the appropriate PHY header 1210 followed by the PSDU 1220 that carries the A-MDPU 1230 passed down by the MAC, followed by paddings and tail bits if required. The PHY issues the PHY-TXEND.confirm primitive 1206 to signal the end of transmission of the 802.11 PPDU. Since the ADD-WUR parameter was set to ADD-WUR-NOGAP, the PHY immediately switches to WUR transmission mode and starts the transmission of the Wakeup preamble portion of the WUP Payload 1240. When the transmission of the Wakeup preamble is completed, the PHY issues the PHY-WUR-TXSTART.confirm primitive 1260.

Upon receiving the PHY-WUR-TXSTART.confirm primitive 1260, the MAC starts transferring the WUR Payload 1250 to the PHY one octet at a time by issuing the PHY-WUR-DATA.request primitive 1262, while the PHY issues the PHYWUR-DATA.confirm primitive 1264 to acknowledge the transfer of the data. Once the MAC has completed transferring the WUR Payload 1250 to the PHY, it issues the PHY-WUR-TXEND.request primitive 1266 to request the end of transmission of the piggybacked WUP Payload 1240. The PHY issues the PHY-WUR-TXEND.confirm primitive 1268 to acknowledge the end of the transmission the WUP Payload 1240.

Second Embodiment

Referring to FIG. 13, another example transmission scheme 1300 for implementing the present disclosure is illustrated. As mentioned earlier in FIG. 9, at time t1 (indicated as 944), if STA2 goes back to the WUR energy detection stage upon expiry of the WUR Preamble detection period, there is a risk that at time t2 (indicated as 946), STA2 may fail to detect the change in energy level between the transmission of the 802.11 PPDU 910 and the WUP Payload 920. In this example, instead of transmitting the piggy-backed WUP Payload 1320 immediately after the end of transmission of the 802.11 PPDU 1310, the PHY waits a very short period of time as shown by 1330 before transmitting the WUP Payload 1320. As an example, the period 1330 could be two 802.11 OFDM symbols, which works out to be 8 micro-seconds. The period 1330 may be a fixed duration defined in the specification or it may be decided during the WUR negotiation between the AP 110 and the WUR STAs.

Due to the existence of this gap in transmission, during the WUR Energy detection stage, the WUR receiver (WURx) can be configured to trigger the transition to the WUR preamble detection stage upon detection of a sharp rise in the energy level of the received signal. This can be better explained with the example transmission sequence 1400 in FIG. 14. In this example, the period 1330 has been negotiated as two OFDM symbols (8 micro-seconds). STA1 has implemented the three-stage wakeup receiver architecture mentioned earlier and stays in the WUR Energy detection stage during idle listening period of the WUR mode. At time t0 (indicated as 1440), the AP starts the transmission of the host 802.11 PPDU 1410 which is detected by STA1 due to the sharp rise in the energy level and it transitions to the WUR Preamble detection stage. However, STA1 fails to detect a valid wakeup preamble within the WUR Preamble detection period and at time t1 (indicated as 1442) STA1 goes back to the WUR Energy detection stage. Subsequently, at time t2 (indicated as 1444), the transmission of the 802.11 PPDU 1410 ends and the AP's PHY waits for two OFDM symbols (8 micro-seconds) as shown by 1412 before starting the transmission of the WUP Payload 1420 in WUR waveform at time t3 (indicated as 1446).

This results in a sharp increase in the energy level which can be easily detected by the WURx of STA2, thus facilitating smooth transition to the WUR Preamble detection stage. In this way, the STA can start searching for a valid Wakeup preamble 1422 and subsequently goes on to decode the WUR Payload before transitioning to the PCR mode.

Third Embodiment

Referring to FIG. 15, yet another example transmission scheme 1500 for implementing the present disclosure is illustrated. In this scheme, the host 802.11 PPDU 1510 is transmitted independently by following 802.11 channel access mechanism.

After completing the transmission of the host 802.11 PPDU, the AP waits for a fixed duration of a Short Inter-frame Space (SIFS) 1520 and then transmits the legacy 802.11 preamble portion 1530 of the WUR packet. The legacy 802.11 preamble is followed by the transmission of the dummy 20 MHz OFDM symbol D-SIG 1540 of duration 4 micro-seconds modulated in Binary Phase Shift Keying (BPSK) to prevent 802.11n devices from wrongly decoding the packet as being an 802.11n packet. The legacy 802.11 preamble together with the D-SIG symbol inform other third party STAs of the impending transmission of the WUP Payload and helps to prevent unintended transmission collisions.

Finally, the WUP Payload 1550 is transmitted in the WUR waveform right after the D-SIG symbol 1540. Since the WUR packet is transmitted not more than SIFS after the host 802.11 PPDU, other STAs are prevented from gaining access to the wireless channel and at the same time the overhead of channel access for the transmission the WUR packet is avoided.

Referring to FIG. 16, 1600 illustrates the use of the PHY SAP primitives for the transmission scheme 1500. The MAC entity instructs the PHY to start the transmission of a host 802.11 PPDU 1610 using existing PHY SAP primitives. Upon completion of the transmission of the PPDU 1610, the PHY issues the PHY-TXEND.confirm primitive 1620. The MAC then requests the transmission of WUR packet by issuing the PHY-WUR-TXSTART.request primitive 1630 that carries the parameter vector WUR-TXVECTOR which carries the parameters listed in table 1100 in FIG. 11 related to transmission of a WUP Payload. In this example, the parameters are set as follows:

WUR_FORMAT: set to WUR_SU
  WUR_L_PREAMBLE: set to PRESENT
  WUR_L_LENGTH: set to the length of the WUP Payload 1650.
  WUR_MODULATION: set to WUR_OOK
  WUR_LENGTH: set to the length of the WUR Payload portion of the WUP Payload 1650.
  WUR_DATARATE: set to the datarate used for the WUR Payload.

At SIFS from the end of the PPDU 1610, the PHY starts the transmission of the legacy 802.11 preamble 1640 followed by the Wakeup preamble portion of the WUP Payload 1650. When the transmission of the Wakeup preamble is completed, the PHY issues the PHY-WUR-TXSTART.confirm primitive 1660. Upon receiving the PHYWUR-TXSTART.confirm primitive 1660, the MAC starts transferring the WUR Payload 1652 to the PHY one octet at a time by issuing the PHY-WUR-DATA.request primitive 1662, while the PHY issues the PHY-WUR-DATA.confirm primitive 1664 to acknowledge the transfer of the data. Once the MAC has completed transferring the WUR Payload 1652 to the PHY, it issues the PHY-WUR-TXEND.request primitive 1666 to request the end of transmission of the WUP Payload 1650. The PHY issues the PHY-WUR-TXEND.confirm primitive 1668 to acknowledge the end of transmission of the WUP Payload 1650.

<Configuration of an Access Point>

FIG. 17 is a block diagram of the PCR 1700 of an example AP that implements the piggybacked transmission scheme described in the present disclosure. The AP may be the AP 110 in FIG. 1. The PCR 1700 is connected to the antenna 1702, and is used for the transmission and reception of 802.11 signals as well as for the transmission of wakeup signals. PCR 1700 comprises an RF/Analog front end 1710, a PHY processing unit 1720, a MAC processing unit 1750, a WUR Payload Generator 1740, a PCR payload generator 1760 and a Packet scheduler 1770.

The RF/Analog front end 1710 is responsible for transfer of analog signals to/from the antenna 1702 and may comprise of sub-components such as Automatic Gain Control (AGC), Low Pass Filter (LPF), Analog-to-Digital Converter (ADC) and so on.

The PHY Processing unit 1730 is responsible for the processing of the PHY layer signals and comprise of an important sub-module, the OFDM modulator/demodulator 1720. The OFDM modulator/demodulator 1720 is responsible for the modulation of transmit signals or demodulation of received OFDM signals.

On the transmission side, aside from applying OFDM modulation to 802.11 PPDUs, the OFDM modulator/demodulator 1720 is also used to generate WUR signal (e.g. OOK) by populating selected OFDM subcarriers. Using the same module to generate both 802.11 OFDM signals as well as WUR waveform has additional benefit for the transmission scheme presented in the present disclosure. In general, it is not trivial to generate a continuous concatenated signal that consists of two different packets modulated by different modulation schemes. However, using the OFDM modulator/demodulator 1720 configured to generate both 802.11 signals as well as WUR signals, the AP can generate continuous concatenated piggybacked packets without any special processing, thereby saving additional processes such as waveform shaping at the end of each modulated signal, switching of modulators for each modulated signal, tight timing control for concatenation of signals etcetera.

The MAC Processing unit 1750 is responsible for various MAC related processing such as retransmission, fragmentation, aggregation etcetera. The WUR payload generator 1740 and the PCR payload generator 1760 are responsible for generation of WUR signals and 802.11 signals respectively and their activities are controlled by the Packet scheduler 1770 that determines the timings for the generation of the 802.11 signals and WUR signals.

FIG. 18 is a more detailed block diagram of an example AP 1800, which may be the AP 110 in FIG. 1. The AP 1800 comprises a Central Processing Unit (CPU) 1830 coupled to a memory 1820, a secondary storage 1840, one or more wireless communication interfaces 1850, as well as other wired communication interfaces 1880. The secondary storage 1840 may be a non-volatile computer readable storage medium that is used to permanently store pertinent instruction codes, data etc.

At the time of start up, the CPU 1830 may copy the instruction codes as well as related data to the volatile memory 1820 for execution. The instruction code may be an operating system, user applications, device drivers, execution codes etc. which are required for the operation of the AP 1800. The size of the instruction code and hence the storage capacity of both the secondary storage 1840 as well as the memory 1820 may be substantially bigger than that of the STA 2000.

The AP 1800 may also comprise a power source 1810 which in most cases may be a power mains but in some cases may also be some kind of high capacity battery for e.g. a car battery. The wired communication interface 1870 may be an ethernet interface, or a powerline interface, or a telephone line interface etc.

The wireless communication interface 1850 may comprise an interface for cellular communication, or an interface for short range communication protocols such as Zigbee, or it may be a WLAN interface. The Wireless interface 1850 may further comprise a MAC module 1852 and a PHY module 1860. The MAC module 1852 of an AP may be substantially more complicated than that of a STA 2000 and may comprise many sub-modules. Among other sub-modules, the MAC module 1852 may comprise a WUR Payload Generator 1858, a PCR payload generator 1854 and a Packet scheduler 1856. The PHY module 1860 is responsible for the conversion of the MAC module data to/from the transmission/reception signals and comprise of an OFDM modulator/demodulator 1862 that is used for modulation/demodulation of 802.11 OFDM signals as well as for the modulation of WUR signals. The wireless interface may also be coupled, via the PHY module, to one or more antennas 1802 that are responsible for the actual transmission/reception of the wireless communication signals on/from the wireless medium.

An AP as per the present disclosure may comprise many other components that are not illustrated, for sake of clarity, in FIG. 17 and FIG. 18. Only those components that are most pertinent to the present disclosure are illustrated.

<Configuration of a STA>

FIG. 19 illustrates a WUR STA 1900 that is equipped with two separate radios: a PCR 1960 for transmitting and receiving 802.11 OFDM signals and a WUR 1910 for receiving WUR signals.

The WUR 1910 further comprise of several sub components such as an RF/Analog Front End 1912 responsible for receiving the analog radio signals from the antenna 1902, an Energy Detection module 1914 responsible for observing the signal strength of the received wakeup signals, a WUR Preamble Detection module 1916 responsible for detecting and decoding the preamble portion of the wake up signal, a WUR Packet Decoding/Processing module 1918 responsible for decoding and processing the payload portion of the wakeup signal and finally a Power Control module 1920 responsible for scheduling the power states of the rest of the modules.

The PCR 1960 comprises an RF/Analog front end 1962, a PHY processing unit 1964 and a MAC processing unit 1968. The RF/Analog front end 1962 is responsible for transfer of analog signals to/from the antenna 1902 and may comprise of sub-components such as Automatic Gain Control (AGC), Low Pass Filter (LPF), Analog-to-Digital Converter (ADC) and so on. The PHY Processing unit 1964 is responsible for the processing of the PHY layer signals and comprise of an important sub-module, the OFDM modulator/demodulator 1966 that is responsible for the modulation of transmit OFDM signals or demodulation of received OFDM signals.

FIG. 20 is a detailed block diagram of an example STA 2000 that that implements three-stage wakeup receiver architecture described in the present disclosure and may be any one of the STAs in FIG. 1. The STA 2000 comprises a Central Processing Unit (CPU) 2030 coupled to a memory 2020, a secondary storage 2040, one or more PCR interfaces 2050 as well a WUR interface 2060. Both the PCR interface 2050 and the WUR interface 2060 are connected to the same wireless antenna 2002. The secondary storage 2040 may be a non-volatile computer readable storage medium that is used to permanently store pertinent instruction codes, data etc.

At the time of start up, the CPU 2030 may copy the instruction codes as well as related data to the volatile memory 2020 for execution. The instruction code may be an operating system, user applications, device drivers, execution codes etc. which are required for the operation of the STA 2000. The STA 2000 may also comprise a power source 2010 for example a lithium ion battery or a coin cell battery etc. or it may also be Mains electricity. The PCR interface 2050 may comprise an interface for cellular communication, or an interface for short range communication protocols such as Zigbee, or it may be a WLAN interface.

The PCR interface 2050 may further comprise a MAC module 2052 and a PHY module 2054. The WUR interface 2060 further comprise of several sub components such as an RF/Analog Front End 2062 responsible for receiving the analog radio signals from the antenna 20002, an Energy Detection module 2064 responsible for observing the signal strength of the received wakeup signals, a WUR Preamble Detection module 2068 responsible for detecting and decoding the preamble portion of the wake up signal, a WUR Packet Decoding/Processing module 2070 responsible for decoding and processing the payload portion of the wakeup signal, and a Power Control module 2066 responsible for scheduling the power states of the rest of the sub-modules of the WUR interface 2060. In addition, the WUR interface 2060 also maintains the WUR preamble detection period timer 2072 to keep track of time that the WUR STA has been in the WUR preamble detection stage, and also a low power CPU 2080 that is used to drive the WUR Packet Decoding/Processing module 2070. At any point in time, only one of the wireless interfaces is expected to be in operation, either the PCR interface 2050 or the WUR interface 2060.

A STA as per the present disclosure may comprise many other components that are not illustrated, for sake of clarity, in FIG. 19 or FIG. 20. Only those components that are most pertinent to the present disclosure are illustrated.

INDUSTRIAL APPLICABILITY

This disclosure can be applied to a wireless apparatus for reduction in the overheads associated with transmission of WUR packets.

REFERENCE SIGNS LIST 110, 1800 AP
120 STA
130, 140 WUR STA
122, 132, 142, 1700, 1960, 2050 PCR
134, 144, 1910, 2060 WUR
1702, 1802, 1902, 2002 Antenna
1710, 1912, 1962 RF/Analog Front End
1720, 1860, 1964, 2054 PHY processing circuitry
1730, 1860, 1966 OFDM Modulator/Demodulator
1740, 1858 WUR Payload Generator
1750, 1850, 1968, 2062 MAC processing circuitry
1760, 1854 PCR Payload Generator
1770, 1856 Packet Scheduler
1810 Power Source
1820, 2020 Memory
1830, 2030 CPU
1840, 2040 Secondary Storage
1850 Wireless I/F
1870 Wired Communication I/F
1914, 2064 Energy Detection module
1916, 2068 WUR Preamble Detection
1918, 2070 WUR Packet Decoding/Processing module
2010 Power Source
2066 Power Control Module
2072 WUR preamble detection period timer

The invention claimed is:
1. A communication apparatus comprising:
circuitry which, in operation, schedules a 802.11 Beacon frame and a WUR Beacon frame wherein the circuitry schedules a transmission of the 802.11 Beacon frame followed by a transmission of the WUR Beacon frame, and
a transmitter which in operation, transmits the 802.11 Beacon frame and the WUR Beacon frame.
2. The communication apparatus according to claim 1, wherein the WUR Beacon frame includes a duration field which indicates a time period, and sets a Network Allocation Vector (NAV) for the time period.
3. The communication apparatus according to claim 1, wherein the circuitry schedules the transmission of the WUR Beacon frame a determined time after the transmission of the 802.11 Beacon frame.
4. The communication apparatus according to claim 3, wherein the determined time is a Short Interframe Space (SIFS).
5. The communication apparatus according to claim 3, wherein the determined time is less than a Short Interframe Space (SIFS).
6. The communication apparatus according to claim 1, wherein the circuitry does not schedule a transmission of any other frames between the transmission of the 802.11 Beacon frame and the transmission of the WUR Beacon frame.

7. A communication method for wireless station comprising:
- scheduling a 802.11 Beacon frame and a WUR Beacon frame wherein a transmission of the 802.11 Beacon frame is followed by a transmission of the WUR Beacon frame, and
- transmitting the 802.11 Beacon frame and the WUR Beacon frame.

8. The communication method according to claim 7, wherein the WUR Beacon frame includes a duration field which indicates a time period, and sets a Network Allocation Vector (NAV) for the time period.

9. The communication method according to claim 7, wherein the transmission of the WUR Beacon frame is scheduled a determined time after the transmission of the 802.11 Beacon frame.

10. The communication method according to claim 9, wherein the determined time is a Short Interframe Space (SIFS).

11. The communication method according to claim 9, wherein the determined time is less than a Short Interframe Space (SIFS).

12. The communication method according to claim 7, wherein a transmission of any other frames are not scheduled between the transmission of the 802.11 Beacon and the transmission of the WUR Beacon frame.

* * * * *